(12) United States Patent
Mullaney et al.

(10) Patent No.: US 7,110,534 B1
(45) Date of Patent: Sep. 19, 2006

(54) TERMINAL BLOCKS AND METHODS FOR MAKING AND BREAKING CONNECTIONS IN A TELECOMMUNICATION CONDUCTOR

(75) Inventors: Julian Mullaney, Raleigh, NC (US); William Alan Carrico, Raleigh, NC (US); Randy Duaine Wilkinson, Angier, NC (US); Eric Emmanual Alston, Fuquay-Varina, NC (US)

(73) Assignee: Tyco Electronics Corporation, Middletown, PA (US)

( * ) Notice: Subject to any disclaimer, the term of this patent is extended or adjusted under 35 U.S.C. 154(b) by 1150 days.

(21) Appl. No.: 09/626,168

(22) Filed: Jul. 27, 2000

(51) Int. Cl.
*H04M 3/00* (2006.01)
*H01R 9/22* (2006.01)

(52) U.S. Cl. .................. 379/428.01; 379/325; 439/709

(58) Field of Classification Search .......... 379/399.01, 379/412, 413.02, 413.04, 419, 428.01, 441, 379/325–332; 439/540.01, 412, 413, 709, 439/389, 417, 708
See application file for complete search history.

(56) References Cited

U.S. PATENT DOCUMENTS

| | | | |
|---|---|---|---|
| 3,466,254 A | 9/1969 | Deasy ...................... 200/11 D |
| 3,467,792 A | 9/1969 | Allison ..................... 200/11 D |
| 4,115,665 A | 9/1978 | Giacoppo et al. ........ 439/540.1 |
| 4,276,562 A | 6/1981 | Stewart et al. .............. 725/151 |
| 4,447,105 A * | 5/1984 | Ruehl ......................... 439/489 |
| 4,494,138 A | 1/1985 | Shimp ........................ 725/121 |
| 4,559,420 A | 12/1985 | Yamada ...................... 200/6 A |
| 4,578,702 A | 3/1986 | Campbell, III ............. 725/149 |
| 4,634,207 A | 1/1987 | Debbaut ..................... 439/521 |
| 4,640,995 A | 2/1987 | Naaijer .................. 200/11 DA |
| 4,686,667 A | 8/1987 | Ohnsorge .................. 398/100 |
| 4,864,725 A | 9/1989 | Debbaut ....................... 29/871 |
| 4,885,747 A | 12/1989 | Foglia ......................... 370/490 |
| 4,924,345 A * | 5/1990 | Siemon et al. .............. 379/331 |
| 4,930,120 A | 5/1990 | Baxter et al. ............... 370/487 |
| 4,935,924 A | 6/1990 | Baxter ........................ 370/487 |
| 4,959,554 A | 9/1990 | Underwood, IV et al. .... 307/38 |
| 5,058,198 A | 10/1991 | Rocci et al. ................. 725/149 |
| 5,093,718 A | 3/1992 | Hoarty et al. ............... 725/120 |
| 5,130,793 A | 7/1992 | Bordry et al. ................. 725/78 |
| 5,149,278 A * | 9/1992 | Waas et al. .................. 439/412 |

(Continued)

FOREIGN PATENT DOCUMENTS

WO     WO 94/18722     8/1994

OTHER PUBLICATIONS

International Search Report for PCT/US01/21926.

*Primary Examiner*—Ovidio Escalante
(74) *Attorney, Agent, or Firm*—Myers Bigel Sibley & Sajovec

(57) ABSTRACT

In embodiments of the present invention, telecommunications terminal blocks are provided for making and breaking connections between a first telecommunications conductor, a second telecommunications conductor and a service wire. The terminal block includes a housing having a first connector connected to the first telecommunications conductor and a second connector connected to the second telecommunications conductor mounted therein. A first conductor is provided in the housing, the first conductor being electrically connected to the first connector and having a service wire connector portion configured to receive the service wire. A switch electrically connects the first connector and the second connector, the switch having a first state wherein the first connector is electrically connected to the second connector and a second state wherein the first connector is electrically disconnected from the second connector. Methods are also provided.

72 Claims, 26 Drawing Sheets

U.S. PATENT DOCUMENTS

| | | | |
|---|---|---|---|
| 5,187,733 A | 2/1993 | Beffel et al. | 379/9.06 |
| 5,363,432 A | 11/1994 | Martin et al. | 379/90.01 |
| 5,423,694 A * | 6/1995 | Jensen et al. | 439/417 |
| 5,481,073 A | 1/1996 | Singer et al. | 200/1 R |
| 5,505,901 A | 4/1996 | Harney et al. | 725/4 |
| 5,557,250 A * | 9/1996 | Debbaut et al. | 338/21 |
| 5,583,863 A | 12/1996 | Darr, Jr. et al. | 370/397 |
| 5,583,864 A | 12/1996 | Lightfoot et al. | 370/396 |
| 5,704,797 A | 1/1998 | Meyerhoefer et al. | 439/188 |
| 5,729,370 A | 3/1998 | Bernstein et al. | 398/66 |
| 5,859,895 A | 1/1999 | Pomp et al. | 379/9.05 |
| 6,031,300 A | 2/2000 | Moran | 307/119 |
| 6,093,050 A | 7/2000 | Baum et al. | 439/412 |
| 6,238,250 B1 * | 5/2001 | Stohr et al. | 439/676 |
| 6,299,475 B1 * | 10/2001 | Huspeni et al. | 439/412 |
| 6,729,900 B1 * | 5/2004 | Dooley | 439/417 |

* cited by examiner

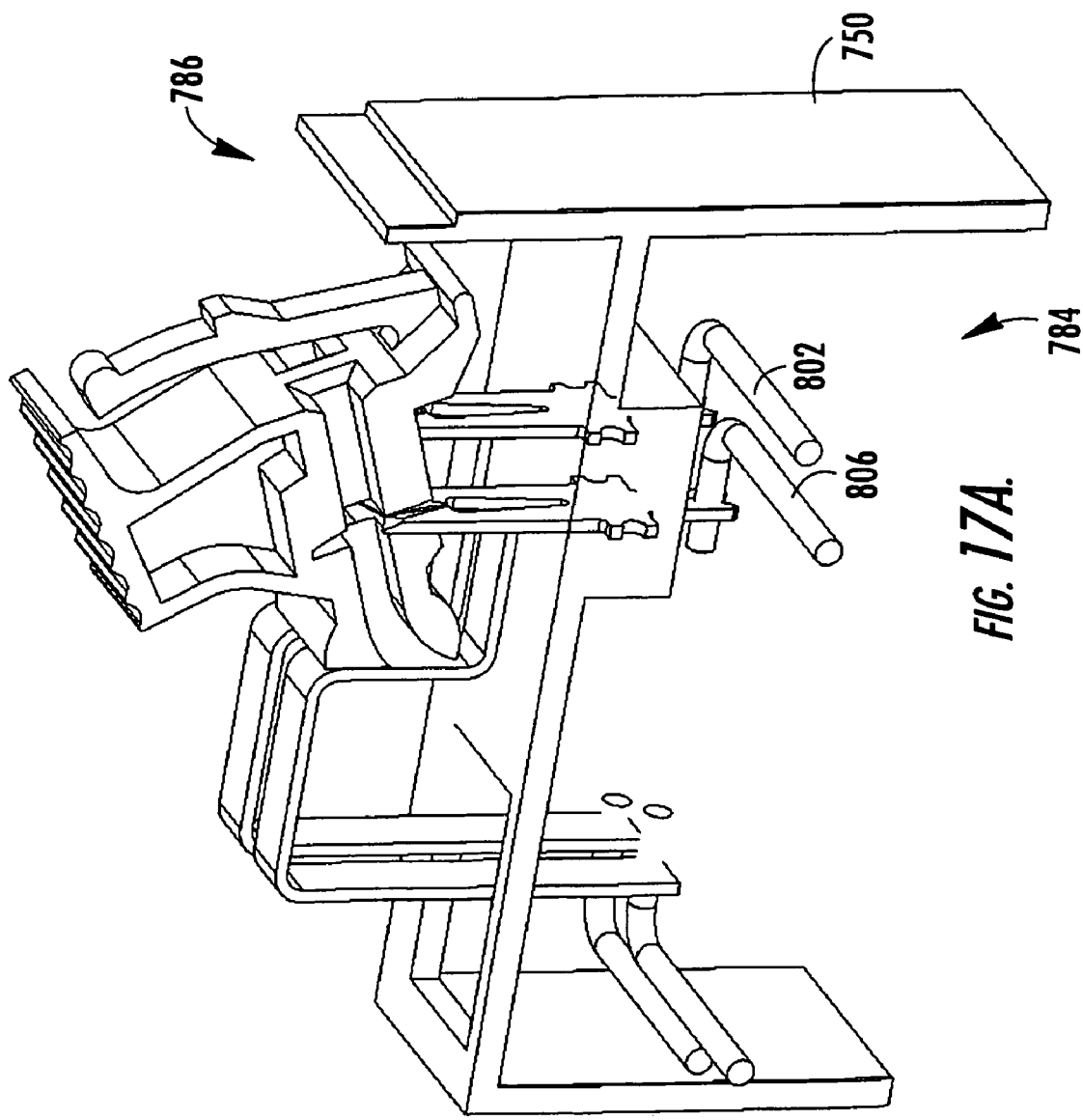

US 7,110,534 B1

TERMINAL BLOCKS AND METHODS FOR MAKING AND BREAKING CONNECTIONS IN A TELECOMMUNICATION CONDUCTOR

FIELD OF THE INVENTION

The present invention relates generally to telecommunications and, more particularly, to connecting devices and methods for connecting telecommunications conductors.

BACKGROUND OF THE INVENTION

Terminal blocks are used by telecommunications companies to connect connector wires of a multi-core cable to service wires that extend to customer residences or places of business. Such terminal blocks are typically mounted outdoors and are, thus, exposed to environmental conditions, such as rain, snow, sleet, ice, temperature fluctuations, dirt, insect infestation and similar conditions that may adversely affect the electrical connections between the service wires and the electrical connectors. Thus, some form of sealant material may be provided in such terminal blocks.

Referring now to the schematic illustration of FIG. 1, a typical telephone company (Telco) telecommunications conductor cable 20 extends from the Telco central office 22 to feed pedestals in a neighborhood or neighborhoods. The Telco telecommunications conductor cable 20 may include as many 900 or more pairs of telecommunications conductor wires. At a splice 24, one or more of the pairs of telecommunications wires are accessed. FIG. 1 illustrates a single tip line 26 and ring line 28 which are spliced at the splice 24 into a cable extending to pedestal 32. Note that, while only one pair of wires 26, 28 is illustrated, the splice typically includes bridge connections for 25 pairs of wires with a 25 pair cable 30 extending from the splice 24 to the pedestal 32. Thus, the telecommunications wire pair 26, 28 and the other 24 pairs which are bridge connected to the pedestal 32 also continue to extend within the telecommunications conductor cable 20 and are, therefore, available for use at additional pedestals further downstream from the Telco central office 22.

In the pedestal 32, the telecommunications wire pair 26, 28 is connected to a terminal block 34. It is further to be understood that, while only one terminal block 34 is illustrated, a terminal block assembly including a plurality of module stations, which may share a common base, is typically provided for all the pairs of the cable 30. The terminal block 34 provides a connection point between telecommunications wire pair 26, 28 and the customer service wires 36. A telecommunications connection may thus be provided between the customer 38 and the Telco central office 22. In addition, by utilizing a bridge connection at the splice 24, the telephone company maintains the flexibility of using ones of the pairs of wires in the telecommunications conductor cable 20 at different pedestals 32 depending upon customer requirements at various locations within a neighborhood or neighborhoods.

An example of terminal blocks 34 according to the prior art is described in U.S. Pat. No. 5,557,250 entitled "Telecommunications Terminal Block" which is incorporated herein by reference as if set forth in its entirety. Telecommunications terminal blocks may also be utilized for establishing a connection between internal wiring of the customer 38 and the customer service wires 36. An example of such a telecommunications terminal block is described in U.S. Pat. No. 5,423,694 entitled "Telecommunications Terminal Block" which is incorporated herein by reference as if set forth in its entirety.

The telecommunications infrastructure as described with reference to FIG. 1 is generally directed to providing conventional voice services to a plurality of customers 38. The conductors 20, 26, 28, 36 are typically copper wires well suited to supporting voice communications. With the increased popularity of data based communications, which are typically digital transmissions, additional demands are being placed on the telephone infrastructure. For example, the Internet is growing increasingly popular with expanding information and services available to customers utilizing the Internet. The increase in content and opportunity for utilization of the Internet further may make it desirable to provide increasing data rates for communications over the telephone infrastructure.

While conventional modems designed for use over the telephone infrastructure are suited to the systems described with reference to FIG. 1, they are typically limited in their communication rate, for example, to 56 kilo bits per second (kbps). More recently, the digital subscriber line (DSL), very high data rate DSL (VDSL), asymmetrical DSL (ADSL) and other DSL technologies have been proposed for bringing higher band width information communications to homes and small businesses over ordinary copper telephone lines such as the cable infrastructure illustrated in FIG. 1. The DSL approach is intended to provide downstream communications connections at data rates from approximately 1.544 megabits per second (mbps) through 384 kbps. However, the data rate available for any individual customer 38 may depend upon a variety of characteristics of the Telco infrastructure including the distance between the customer 38 and the Telco central office 22. The unused length of a customer's telecommunication wire pair, such as pair 26, 28, extending downstream from the splice 24 may further limit the data rate available to individual customers.

SUMMARY OF THE INVENTION

In embodiments of the present invention, telecommunications terminal blocks are provided for making and breaking connections between a first telecommunications conductor, a second telecommunications conductor and a service wire. The terminal block includes a housing having a first connector connected to the first telecommunications conductor and a second connector connected to the second telecommunications conductor mounted therein. A first conductor is provided in the housing, the first conductor being electrically connected to the first connector and having a service wire connector portion configured to receive the service wire. A switch electrically connects the first connector and the second connector, the switch having a first state wherein the first connector is electrically connected to the second connector and a second state wherein the first connector is electrically disconnected from the second connector.

In other embodiments of the present invention, the switch includes a third connector mounted adjacent the second connector in the housing, the first connector being electrically connected to the third connector, and a select module positioned over the second connector and the third connector, the select module having a first position electrically connecting the second connector and the third connector and a second position wherein the second connector and the third connector are not electrically connected. The select module may include a housing and a jumper conductor mounted in the housing of the select module, the jumper conductor having, when the select module is in the first position, a first end positioned to contact the second connector and a second end positioned to contact the third connector.

In further embodiments, the first connector comprises a first end of a longitudinally extending member and the first conductor comprises an opposite end of the longitudinally extending member. The housing of the terminal block may include a base having a first portion and a second portion, the longitudinally extending member being mounted in the first portion with the first conductor extending from an upper surface of the base, the second connector and the third connector being mounted in the second portion of the base. A movably mounted service wire connector member may be positioned adjacent the upper surface of the base in the first portion, the service wire connector member including a service wire receiving passageway that receives a service wire for connection to the first conductor. The service wire connector member may have a first position that provides access to an opening to the service wire receiving passageway to receive a service wire and a second position wherein a portion of the service wire receiving passageway passes through an opening in the first conductor. The housing of the select module may be mounted to the base adjacent the second portion. The first conductor may be an insulation displacing connector and the service wire connector member may be rotatably mounted to the base to insert a service wire in the passageway into the insulation displacing connector. The housing of the select module may be mounted to the base in a first orientation in the first position of the select module and in a second orientation in the second position of the select module. The second orientation may be substantially a 180° rotation from the first orientation.

In other embodiments of the present invention, the first telecommunications conductor is a tip conductor from a telephone company central office and the second telecommunications conductor is a tip conductor extending from the terminal block downstream from the telephone company central office and the service wire is a tip service wire from a user premise. The terminal block further includes a ring input connector mounted in the first portion of the base of the housing of the terminal block connected to a corresponding ring conductor from the telephone company central office paired with the tip conductor. A ring output connector is mounted in the second portion of the base of the housing of the terminal block connected to a corresponding ring conductor extending from the terminal block downstream from the telephone company central office paired with the tip conductor extending from the terminal block downstream from the telephone company central office. A ring conductor electrically connected to the ring input connector extends from the upper surface of the base of the housing of the terminal block in the first portion. A ring jumper connector is mounted in the second portion of the base of the housing of the terminal block adjacent the ring output connector, the ring jump connector being electrically connected to the ring input connector. The select module includes a second jumper conductor mounted in the housing of the select module, the second jumper conductor having, when the select module is in the first position, a first end positioned to contact the ring output connector and a second end positioned to contact the ring jumper connector. The service wire connector member further including a second service wire receiving passageway that receives a ring service wire for connection to the ring conductor, the service wire connector member having a first position that provides access to an opening to the second service wire receiving passageway to receive the ring service wire and a second position wherein a portion of the second service wire receiving passageway passes through an opening in the ring conductor.

In yet other embodiments of the present invention, a ground connector is mounted in the second portion of the base of the housing of the terminal block. An electrical protection device is positioned in the housing of the select module so as to be electrically connected between the jumper conductor and the ground connector and between the second jumper conductor and the ground connector. In further embodiments, the base of the housing of the terminal block is elongate and includes a plurality of termination stations, the termination stations having respective first portions and second portions, tip and ring input connectors, tip and ring output connectors, tip and ring service wire conductors, select modules and service wire connector members to provide a multi-station terminal block.

In further embodiments of the present invention, the housing of the terminal block includes a base having a first portion and a second portion, the first connector and the first conductor being mounted in the first portion with the service wire connector portion extending from an upper surface of the base, the second connector being mounted in the second portion of the base. A movably mounted service wire connector member is positioned adjacent the upper surface of the base in the first portion, the service wire connector member including a service wire receiving passageway that receives a service wire for connection to the first conductor, the service wire connector member having a first position that provides access to an opening to the service wire receiving passageway to receive a service wire and a second position wherein a portion of the service wire receiving passageway passes through an opening in the service wire connector portion of the first conductor. A contact member electrically connected to the second connector and extends from the base of the housing of the terminal block and contacts the first conductor. An actuator is positioned in the service wire connector member so as to allow the contact member to contact the first conductor in the first position of the service wire connector member and to break the contact between the contact member and the first conductor in the second position of the service wire connector member. The contact member may be a first end of an elongate conductive member and the second connector may be a second end of the elongate conductive member. The actuator may be a cam.

In yet further embodiments of the present invention, terminal blocks for making and breaking connections with a telecommunications conductor are provided. The terminal blocks include a base having a first connector and a second connector mounted therein. A first conductor extends from the base, the first conductor being electrically connected to the first connector. A second conductor also extends from the base, the second conductor being electrically connected to the second connector. A service module is provided which is configured to be removably mounted to the base. The service module includes a service wire connector configured to receive a customer telecommunications conductor and a contact member that electrically connects the service wire connector to the first conductor when the service module is mounted to the base. The first conductor and the second conductor are configured so as to electrically connect the first connector and the second connector when the service module is removed from the base. The service module is configured to interrupt the electrical connection of the first connector and the second connector when the service module is mounted to the base.

In further embodiments of the present invention, the contact member is configured to disconnect the electrical connection of the first connector and the second connector when the service module is mounted to the base. The service wire connector may be a first end of a longitudinally extending conductive member positioned to receive the customer telecommunications conductor and the contact member may be a second end of the longitudinally extending conductive member. The second end of the longitudinally extending conductive member may contact the first conductor when the service module is mounted to the base. The service module may include a conductor chamber and the service wire connector may be positioned in the conductor chamber. A passageway may extend into the conductor chamber having an opening for receiving the customer telecommunications conductor and be positioned to pass the customer telecommunications conductor to the service connector.

In other embodiments of the present invention, the first conductor is positioned adjacent to the second conductor so as to contact the second conductor when the service module is removed from the base. The service module may further include a nonconductive member positioned to pass between the first conductor and the second conductor when the service module is mounted to the base. The first conductor and the second conductor may comprise a spring clip. In various embodiments, the nonconductive member extends from a bottom surface of the service module adjacent the base. The contact member may include an electrically conductive layer on a surface of the nonconductive member adjacent the first conductor when the service module is mounted to the base and a connector that electrically connects the electrically conductive layer to the service wire connector. In other embodiments, the nonconductive member includes a channel in a surface thereof adjacent the first conductor when the service module is mounted to the base and the contact member is received in the channel of the nonconductive member.

In further embodiments of the present invention, the first connector is a first end of a second longitudinally extending conductive member and the first conductor is a second end of the second longitudinally extending conductive member. The second connector is a first end of a third longitudinally extending conductive member and the second conductor is second end of the third longitudinally extending conductive member. The service wire connector may be an insulation displacing connector.

In other embodiments of the present invention, the service module includes a base portion defining a conductor chamber. A cover may be rotatably connected to a first end of the base portion on a top portion thereof displaced from the base of the terminal block. A passageway in the cover may extend into the conductor chamber, the passageway having an opening on a second end of the cover opposite the first end for receiving the customer telecommunications conductor. The passageway may be positioned to pass the customer telecommunications conductor to the insulation displacing connector. Rotation of the cover to a closed position may connect the customer telecommunications conductor to the insulation displacing connector.

In further embodiments of the present invention, the terminal block further includes a third connector and a fourth connector mounted in the base. A third conductor may extend from the base, the third conductor being electrically connected to the third connector, and a fourth conductor may extend from the base, the fourth conductor being electrically connected to the fourth connector. The fourth conductor and the third conductor may comprise a second spring clip. In other embodiments the service module further includes a second service wire connector configured to receive a second customer telecommunications conductor and a second contact member that electrically connects the second service wire connector to the third conductor when the service module is mounted to the base. The second spring clip may electrically connect the third connector and the fourth connector when the service module is removed from the base and the second contact member may be configured to electrically disconnect the first connector and the second connector when the service module is mounted in the base.

In other embodiments of the present invention, the nonconductive member includes a second channel in a surface thereof adjacent the third conductor when the service module is mounted to the base and wherein the second contact member is received in the second channel of the nonconductive member. The second channel and the first channel may be in opposite surfaces of the nonconductive member. The first and second customer telecommunications conductors may be tip and ring lines. A line protector may be electrically connected between the first conductor and the third conductor in the service module when the service module is mounted to the elongate base.

In further embodiments of the present invention, the second service wire connector is a first end of a fourth longitudinally extending conductive member positioned to receive the second customer telecommunications conductor and the second contact member is a second end of the fourth longitudinally extending conductive member, the second end of the fourth longitudinally extending conductive member contacting the third conductor when the service module is mounted to the base. The first longitudinally extending conductive member may include a circuit connector and the fourth longitudinally extending conductive member may include a second circuit connector, the circuit connector and the second circuit connector being positioned to receive an electrical device therebetween.

In other embodiments of the present invention, the base is elongate and defines a first axis and the first spring clip is positioned adjacent and laterally offset from the second spring clip with reference to the first axis. A plurality of service modules may be removeably mounted to the elongate base along the first axis. The base may include an elongate chamber and the first spring clip and the second spring clip may be positioned in the elongate chamber. An environmental sealant, such as a gel, may be included in the elongate chamber and in the conductor chamber. The plurality of service modules may include clip members and the elongate base may then include a plurality of clip receptacles spaced along the first axis and configured to receive the clip members to mount the service modules to the elongate base.

In further embodiments of the present invention, the service module includes a conductor chamber and an environmental sealant in the conductor chamber. The service wire connector and the second service wire connector may be positioned in the conductor chamber. The service module may include a circuit contact member that electrically connects to the second conductor when the service module is mounted to the base. The circuit contact member may be configured to electrically connect an electrical device between the first connector and the second connector.

In other embodiments of the present invention, a telecommunications terminal block for making and breaking connections with a telecommunications conductor is provided. The terminal block includes a base having a first connector and a second connector mounted therein. A first conductor extends from the base, the first conductor being electrically connected to the first connector. A second conductor extends from the base, the second conductor being electrically connected to the second connector. A service module is configured to be movably mounted to the base for movement between a first position adjacent the base and a second position displaced vertically from the base. The service module includes a service wire connector configured to receive a customer telecommunications conductor and a contact member that electrically connects the service wire connector to the first connector when the service module is in the first position. The first connector and the second connector are configured so as to electrically connect the first conductor and the second conductor when the service module is in the second position. The service module is configured to interrupt the electrical connection of the first conductor and the second conductor when the service module is in the first position.

In further embodiments of the present invention, methods are provided for making and breaking connections with a telecommunications conductor. X pairs of telecommunications conductor wires from a telecommunications conductor cable extending from a central office facility are severed. The telecommunications conductor cable has more than X pairs of telecommunications conductor wires. A first end of the severed X pairs of telecommunications conductor wires is connected to a first group of X pairs of wires and a second end of the severed X pairs of telecommunications conductor wires is connected to a second group of X pairs of wires. The first and second group of X pairs of wires are extended to a telecommunications customer service wire junction box. Ones of the first group of X pairs of wires are selectively connected to at least one of a pair of customer service wires or one of the second group of X pairs of wires in the customer service wire junction box.

In other embodiments of the methods of the present invention, the customer service wire junction box is a telephone company pedestal and the X pairs of telecommunications conductor wires are severed at a splice, such as a buried splice closure. The number, X, of pairs of wires may be 25. In various embodiments selectively connecting includes leaving corresponding ones of the second group of X pairs of wires disconnected from ones of first group of X pairs of wires which are connected to a pair of customer service wires. Corresponding ones of the second group of X pairs of wires may be connected to ones of first group of X pairs of wires which are not connected to a pair of customer service wires.

In further embodiments of the present invention, telecommunications terminal blocks are provided for making and breaking connections with a telecommunications conductor. The terminal blocks include a base having a first connector and a second connector mounted therein. A first conductor extends from the base, the first conductor being electrically connected to the first connector. A second conductor also extends from the base, the second conductor being electrically connected to the second connector. The terminal blocks further include means for electrically connecting a service wire connector to the first conductor and for interrupting the electrical connection of the first connector and the second connector when the first conductor is connected to the service wire connector and means for electrically connecting the first connector and the second connector when the first conductor is not connected to the service wire connector.

In other embodiments of the present invention, telecommunications terminal blocks are provided for making and breaking connections with a severed telecommunications conductor. The terminal blocks include means for connecting to a first end and a second end of the severed telecommunications conductor. The terminal blocks further include means for connecting the first end to a customer service wire and disconnecting the first end from the second end when the first end is connected to the customer service wire and for connecting the first end and the second end when the first end is not connected to the customer service wire.

In yet other embodiments of the present invention telecommunications terminal blocks are provided for making and breaking connections between a telecommunications conductor and a service wire. The terminal block includes a housing having a first connector and a second connector mounted therein, the first connector being electrically connected to the telecommunications conductor. A first conductor is provided in the housing, the first conductor being electrically connected to the second connector and having a service wire connector portion configured to receive the service wire. An electrical protection device electrically connects the first connector and the second connector. The electrical protection device may be a fuse circuit. The housing may include a base having a first portion and a second portion, the first conductor being mounted in the first portion with the service wire connector portion extending from an upper surface of the base, the first connector and the second connector being mounted in the second portion of the base, the second connector being mounted adjacent the first connector. A movably mounted service wire connector member may be positioned adjacent the upper surface of the base in the first portion, the service wire connector member including a service wire receiving passageway that receives a service wire for connection to the service wire connector portion, the service wire connector member having a first position that provides access to an opening to the service wire receiving passageway to receive a service wire and a second position wherein a portion of the service wire receiving passageway passes through an opening in the service wire connector portion. A protection module may be mounted to the base adjacent the second portion, the electrical protection device being positioned in the protection module.

BRIEF DESCRIPTION OF THE DRAWINGS

FIGS. 17A and 17B are cut-away perspective views of a telecommunications terminal block according to further embodiments of the present invention with a service wire connector member in a first position through connecting telecommunications conductor wires and a second position disconnecting the telecommunications conductor wires.

DETAILED DESCRIPTION OF THE INVENTION

Figure 1:
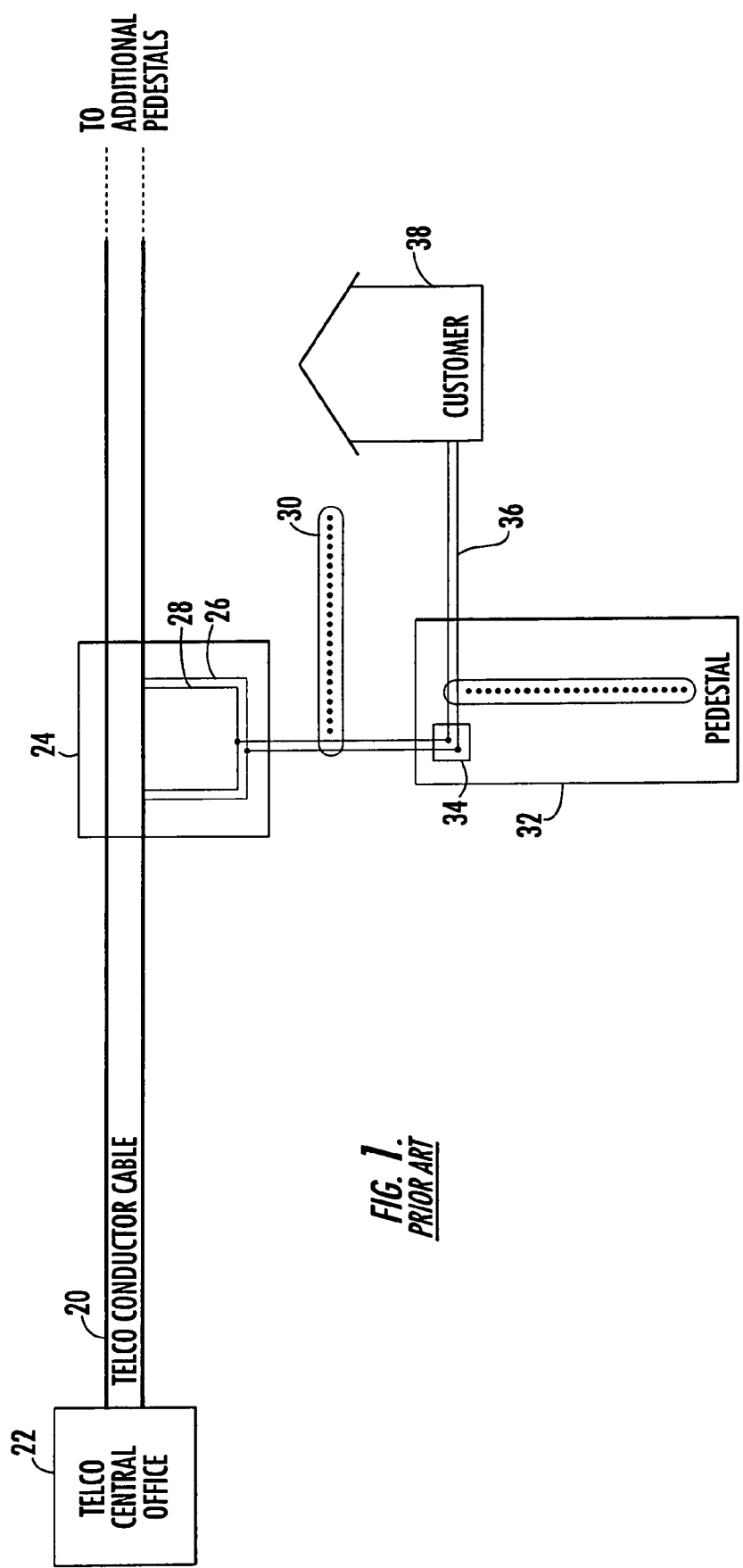
FIG. 1 is a schematic view of a terminal block in a telephone company pedestal connected to customer service wires and to a telecommunications conductor cable from a central office according to the prior art.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. In the drawings, layers, objects and regions may be exaggerated for clarity.

Figure 2:
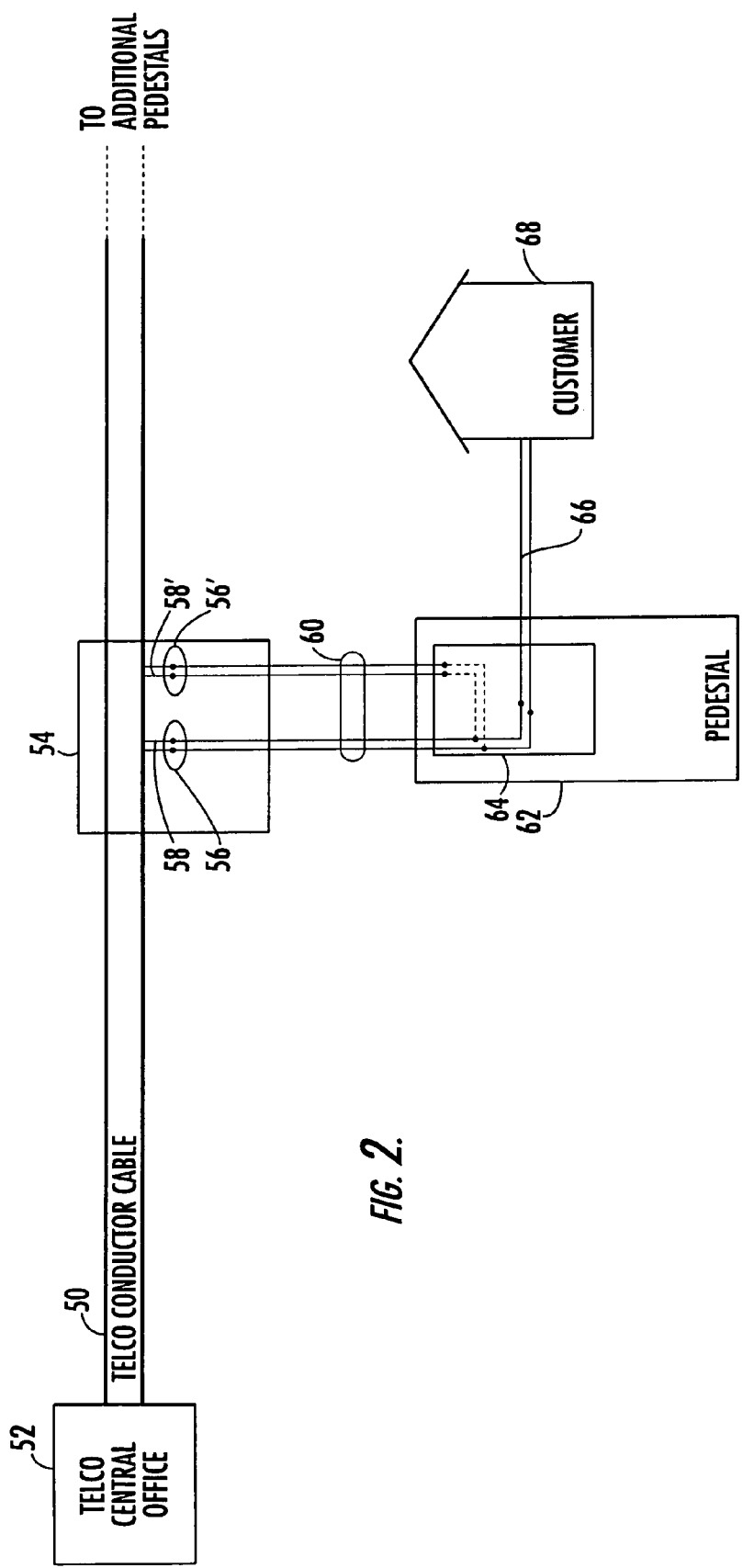
FIG. 2 is a schematic view of a terminal block according to embodiments of the present invention in a telephone company pedestal connected to customer service wires and to a telecommunications conductor cable from a central office.

The present invention will now be described with reference to the embodiments illustrated in the figures. Referring first to FIG. 2, a schematic view of a terminal block according to embodiments of the present invention in a telephone company pedestal connected to customer service wires and to a telecommunications conductor cable from a central office will now be described. The telecommunications conductor cable 50, typically a copper wire cable, extends from the Telco central office 52 to a neighborhood or neighborhoods where customer service is desired. At a splice 54, a plurality of pairs of telecommunications wires are accessed to bring connections to the pedestal 62. The splice 54 may be an underground splice or an above ground splice. Similarly, the pedestal 62 may be provided as a surface mounted pedestal, an overhead suspended pedestal or a buried pedestal. However, pedestals 62 are generally located at ground level at various locations throughout the neighborhood or neighborhood serviced by the telecommunications conductor cable 50.

The connections at the splice 54 to individual wires in the telecommunications conductor cable 50 are schematically illustrated with reference to a single pair of wires 56, 58. As shown in the embodiments of FIG. 2, wires 56, 58 are severed and their corresponding counterpart wires 56', 58' continue to extend downstream from the splice 54 in the telecommunications conductor cable 50 to be available to other pedestal. It is to be understood, however, that a plurality of wire pairs, typically 25 pairs, will be accessed at the splice 54 and routed to the pedestal 62 to provide service access to a plurality of customers 68. As is further illustrated in FIG. 2, each of the wires 56, 58, 56', 58' is routed to the pedestal 62 by cable 60. For example, where 25 wire pairs are accessed at the splice 54, cable 60 may be a 50 pair cable. Alternatively, various other cable configurations, such as two 25 pair cables, may be provided for cable 60. In any event, in accordance with the present invention, both ends of at least one telecommunications wire, including the end extending to the Telco central office 52, shown as 56, 58 in FIG. 2, and the end extending downstream, shown in FIG. 2 as wire 56', 58', is extended to the pedestal 62. As illustrated in FIG. 2, each telecommunications wire accessed at the splice 54 has both ends of the accessed telecommunications wire routed to the pedestal 62. However, in keeping with the present invention, it is to be understood that one or more of the telecommunication wires accessed at the splice 54 may be routed to the pedestal 62 using a bridge connection as was described previously with reference to FIG. 1.

At the pedestal 62, one or more terminal blocks 64 in accordance with embodiments of the present invention are provided. While a single terminal block 64 is shown in FIG. 2 for illustrative purposes, it is to be understood that a plurality of such terminal blocks 64 may be provided in a terminal block assembly. A plurality of service modules may be associated with one or more base units mounted in the pedestal 62 to provide the plurality of terminal blocks 64. For example, where 25 pairs of telecommunication wires are accessed at the splice 54, a single base supporting up to 25 service modules may be provided as will be described further herein.

As shown in the embodiments of FIG. 2, the terminal block 64 may provide a connection from the central office 52 between the telecommunications wire pair 56, 58 and the customer service wire 66 to provide a connection to the customer 68. In addition, the first end of the telecommunication wires 56, 58 extending from the Telco central office 52 may be connected to the corresponding telecommunications wires 56', 58', thereby maintaining an electrical connection from the Telco central office 52 through to downstream locations on the telecommunications conductor cable 50 more remote from the Telco central office 52 than the splice 54. The wires 56, 58 may be directly connected to the wires 56', 58' as illustrated by the dotted lines within the terminal block 64 in FIG. 2. Alternatively, circuitry can be placed between the wires 56, 58, 56', 58'.

Figure 3A:
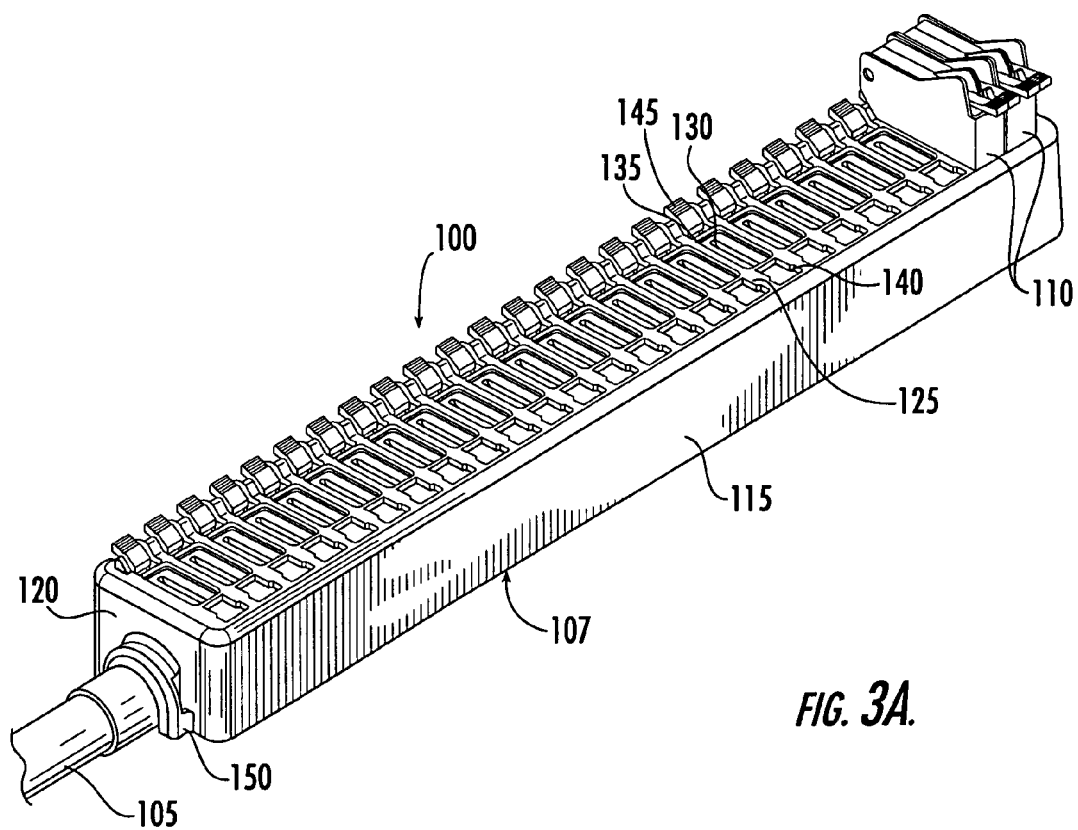
FIGS. 3A and 3B are perspective views of telecommunications terminal blocks according to embodiments of the present invention.

Referring now to FIG. 3A, embodiments of a telecommunications terminal block according to the present invention will now be further described. The telecommunications terminal block assembly 100, as shown in the embodiments of FIG. 3A provides 25 telecommunications terminal blocks for making and breaking connections with a telecommunications conductor. As shown in FIG. 3A, two stations of the telecommunications terminal block assembly 100 are configured as operative terminal blocks with the inclusion of service modules 110. As shown in FIG. 3A, the service modules 110 are configured to be removably mounted to a base 107 configured to support up to 25 service modules 110. Each terminal station within the base 107 may include a first and a second pair of connectors to support tip and ring line connections. The connectors may be mounted in the base 107 so as to allow each station of the base 107 to be wired to an incoming and an outgoing connection for wires in cable 105. For example, a first connector in a base 107 at a first station may be connected to a wire 56 and a second associated connector mounted in the base 107 at the first station may be wired to a corresponding telecommunications wire 56'. The connections of the connectors mounted in the base 107 to wires from the cable 105 may be provided by the manufacturer of the telecommunications terminal block assembly 100 which may then be sold with a pigtail type cable 105. The connections may be a variety of means such as wire wrap, insulation displacing connectors or post type connectors. The base 107 may include a bottom (or base) portion 115 and a top portion 125. The service modules 110 are shown mounted adjacent the top portion 125. An end wall 120 of the base portion 115 may include a connector 150 for securing the cable 105 to the base 107. Each of the service module receiving terminal stations of the base 107, as shown for the embodiments of FIG. 3A, includes a front latch opening 140 and a back latch opening 135 as well as a latch lever 145. The latch openings 135 and 140 are configured to receive associated latches of service modules 110 for mounting the service modules 110 to the base 107. An opening 130 is further provided in the top surface 125 for the terminal stations to allow the service modules 110 access to the connectors within the base 107.

Figure 3B:
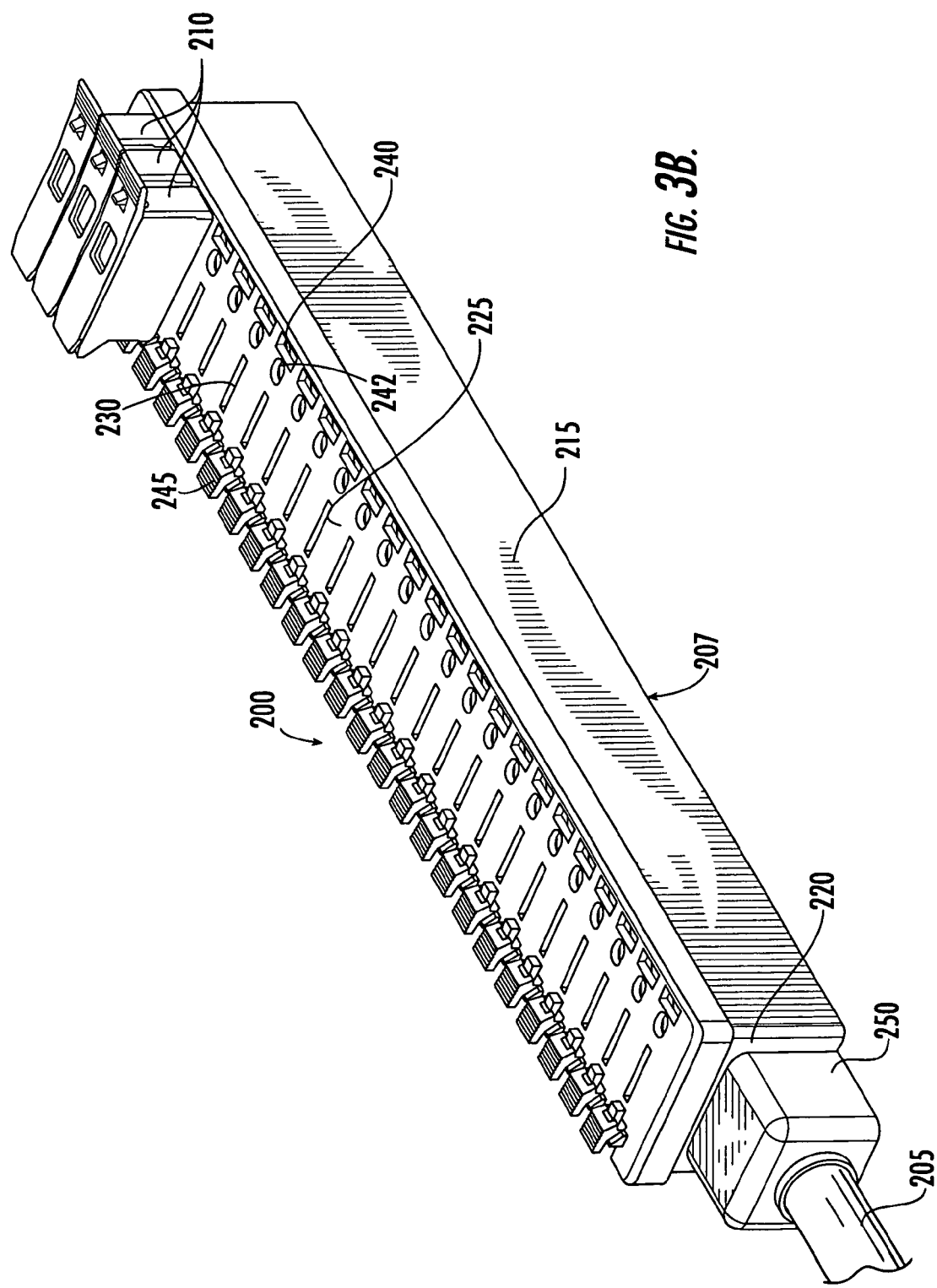

Further embodiments of telecommunications terminal blocks according to the present invention are illustrated in FIG. 3B. The telecommunications terminal block assembly 200 is illustrated with 25 terminal stations, each configured to support one of the service modules 210. The openings 230, 240 and the latch 245 operate substantially as described previously with reference to the openings 130, 140 and latch 145 with reference to FIG. 3A and will not be described further herein. The base 207, as shown in FIG. 3B, includes a bottom (or base) portion 215 and a top cover 225. The openings 242 in the top cover 225 may provide access for components in the service modules 210 to connections, such as a ground strip, in the base 215 and/or to facilitate alignment of the service modules 210. The end wall 220 of the base 207, as shown in FIG. 3B, includes a connector assembly 250 for connecting to the cable 205.

As will be apparent to those of skill in the art from FIGS. 3A and 3B and subsequent figures to be described herein, the terminal block assembly 200 of FIG. 3B differs from the terminal block assembly 100 of FIG. 3A in, among other things, the latching mechanism and the design of the service modules 110, 210. Similarly, the top cover 225 illustrated in FIG. 3B mounts over the base 207 and the connector assembly 250 includes a chamber which may be suitable for providing mechanical support and/or environmental sealing for the conductor cable 205.

Figure 4:
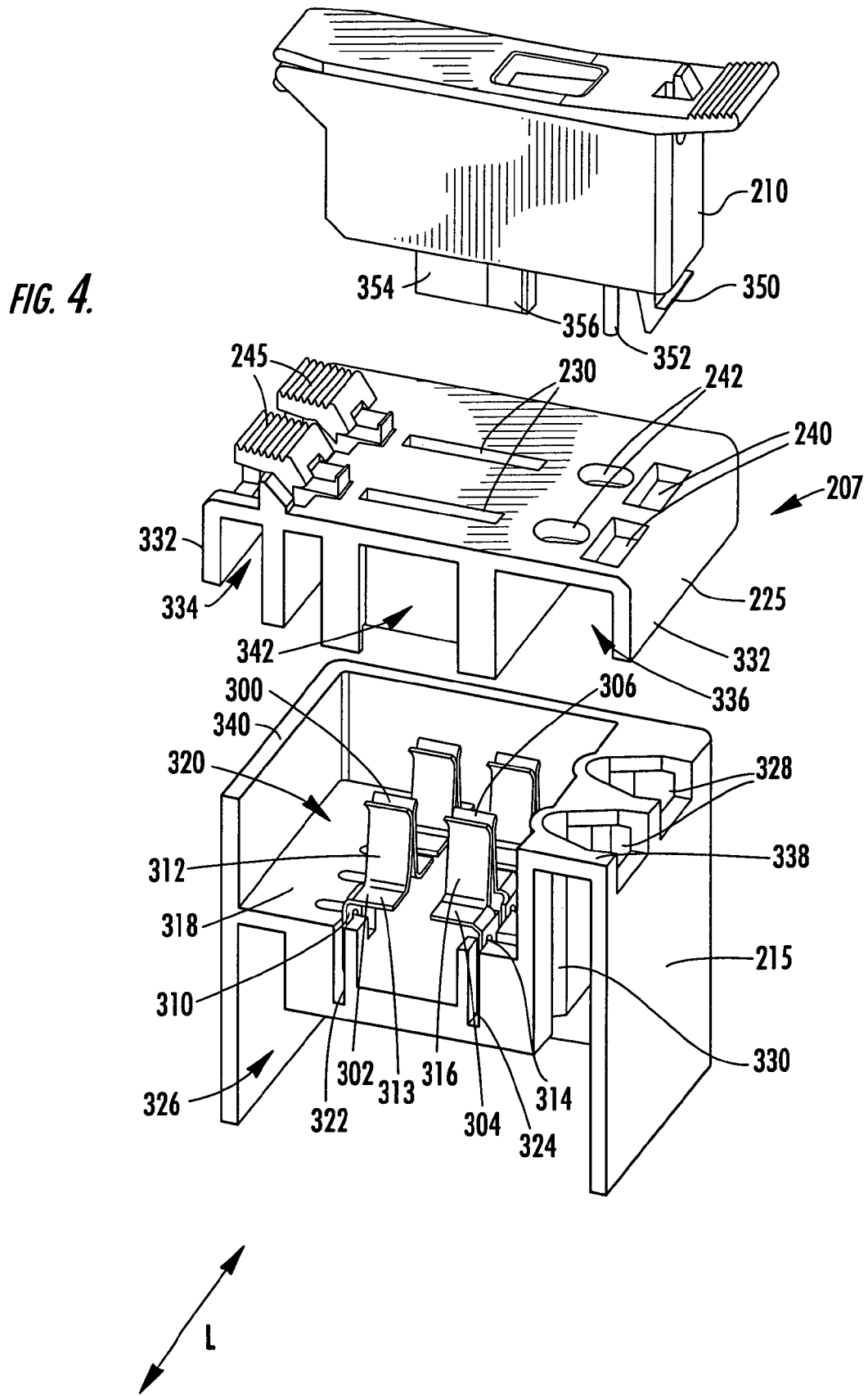
FIG. 4 is an exploded perspective view of a telecommunications terminal block according to embodiments of the present invention illustrating components of the base.

The base 207 will now be further described with reference to the illustration of FIG. 4. As shown in the illustrated embodiments in FIG. 4, a longitudinally extending member 300 and a longitudinally extending member 302 are mounted in the bottom portion 215 of the base 207. The longitudinally extending conductive member 302 includes a connector 310 on a first end thereof and a conductor 312 on a second end thereof. The longitudinally extending conductive member 300 similarly includes a conductor, a portion of which is visible in FIG. 4, on a first end thereof and a connector on a second end thereof (not shown). The conductor 312 and the conductor of member 300 extend from the base 207 with the conductor 312 being electrically connected to the conductor end of connector 300. As shown in FIG. 4, the conductor 312 and the connector 310 each extend longitudinally in opposite directions and at right angles to a connecting plate portion 313. The longitudinally extending conductive member 300 may be similarly configured.

The conductor end of the longitudinally extending member 300 and the conductor 312 are configured so as to electrically connect the connector 310 and the connector (not shown) of the longitudinally extending conductive member 300 when the service module 210 is removed from the base 207. The conductor 312 and the corresponding conductor of the longitudinally extending conductive member 300 thus comprise a spring clip as shown for the embodiments of FIG. 4. In other words, the first conductor 312 and the associated conductor portion of member 300 are positioned in adjacent relationship so as to make contact when the service module 210 is removed from the base 207.

Each terminal station (two of which are shown in FIG. 4) for the embodiments of FIG. 4 includes connections for two wires, for example, of a tip and ring wire (or line). Thus, the described members 300 and 302 may be associated with a first (tip or ring) line and additional longitudinally extending conductive members 304, 306 may be associated with a second (ring or tip) line of the pair of wires associated with a terminal station of the base 207 and an individual service module 210 mounted in the terminal station. As seen in FIG. 4, the member 304 may include a connector 314 at a first longitudinally extending end thereof and a conductor 316 at an opposite end. Thus, members 304, 306 may be configured as described previously with reference to members 300, 302.

The conductors 312, 316 (and the conductor ends of members 300, 306) are shown positioned in an elongate chamber 320 of the base 207. The elongate chamber 320 is defined by the sidewalls 338, 340 and the bottom wall 318. The members 300, 302, 304, 306 as shown in FIG. 4 are mounted in the bottom wall 318 with the connectors 310, 314 positioned in longitudinally extending slots 322 and 324, respectively.

As shown in FIGS. 3A, 3B and 4, the base 207 extends along a first axis L (see FIG. 4). The spring clip defined by the conductors of members 300 and 302 is positioned adjacent and laterally offset from the spring clip defined by two conductors of members 304 and 306 with reference to the axis L. The terminal stations for the respective service modules 210 are positioned along the axis L. However, it is to be understood that the respective spring clips need not be laterally offset and can be placed along the axis L and further may be laterally aligned, as contrasted with the longitudinal offset between the first and second spring clips as shown in the illustrated embodiments of FIG. 4. However, the illustrated offset relationship may facilitate the packaging size requirements of the telecommunications terminal block assembly 200.

The top cover 225, as illustrated in FIG. 4, includes a downwardly extending skirt portion 332 configured to wrap around the bottom portion 215. A channel 336 is positioned to receive the sidewall 338 of the bottom portion 215 and a channel 334 is configured to receive the sidewall 340 of the base portion 215. the openings 328 in the bottom portion 215 are configured to receive the clip 350 of the service module 210 when it passes through the corresponding opening 240 in the top cover 225 and to receive the member 352 passing through the opening 242 in the cover 225. An elongate channel 330 may be configured to receive the member 352. The member 352 may be a conductive member and the channel 330 may be positioned to guide the conductive member 352 into contact with a ground bus positioned in the base 207. The member 352 may further facilitate alignment between the service module 210 and the base 207.

The service module 210 in the illustration of FIG. 4 further includes a nonconductive member 354 extending from a bottom face of the service module 210 and a contact member 356 positioned in a channel on a surface of the nonconductive member 354. The nonconductive member 354 and the contact member 356 pass through the opening 230 when the service module 210 is mounted to the base 207. The contact member 356 may thus be placed in contact with the conductor 316 of the member 304 while, at the same time, a portion of the nonconductive member 354 is positioned between the members 304 and 306 to interrupt the electrical connection therebetween when the service module 210 is mounted to the base 207.

Figure 5A:
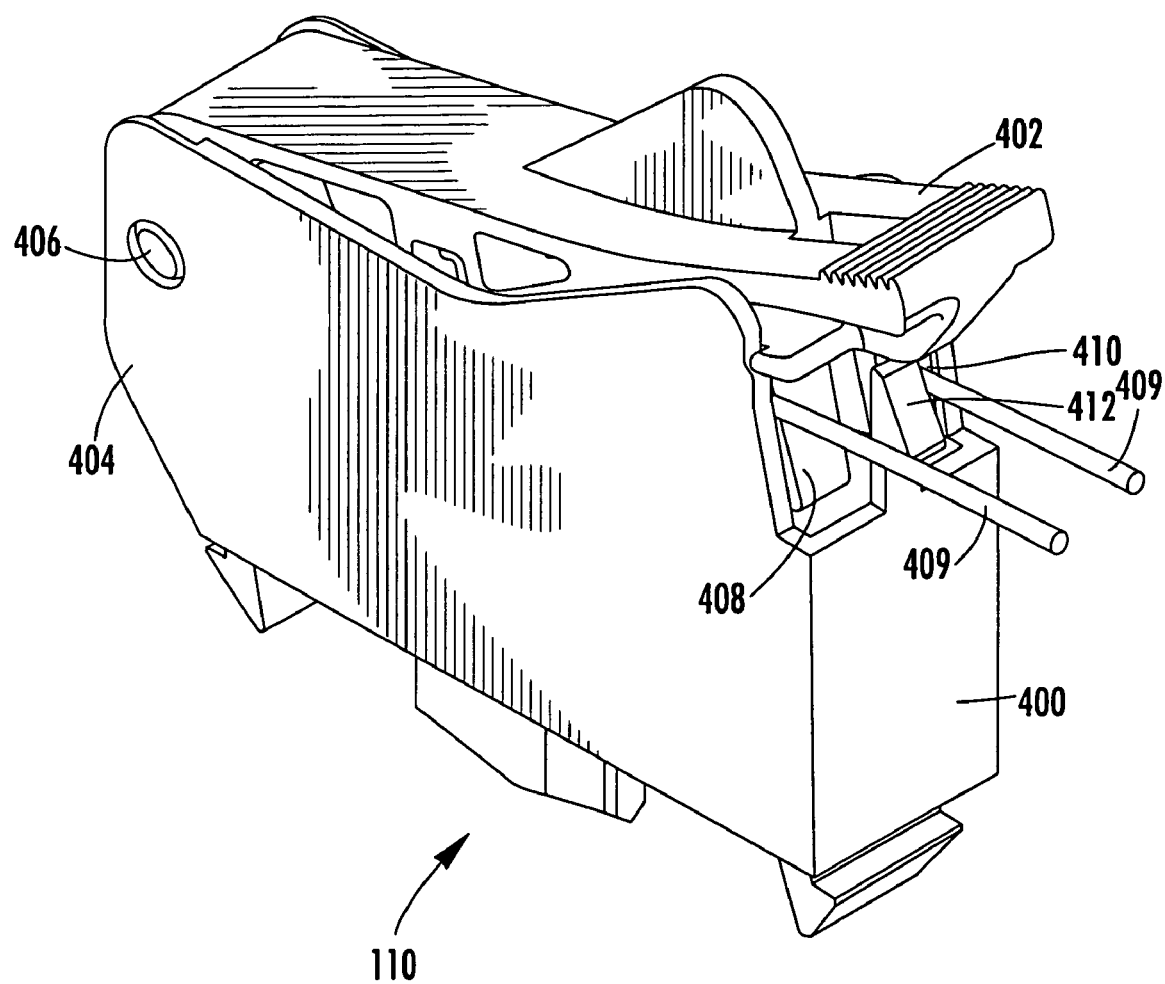
FIGS. 5A and 5B are perspective views of a service module according to embodiments of the present invention having covers in an open position to received customer service wires and a closed position to terminate customer wires respectively.
Figure 5B:
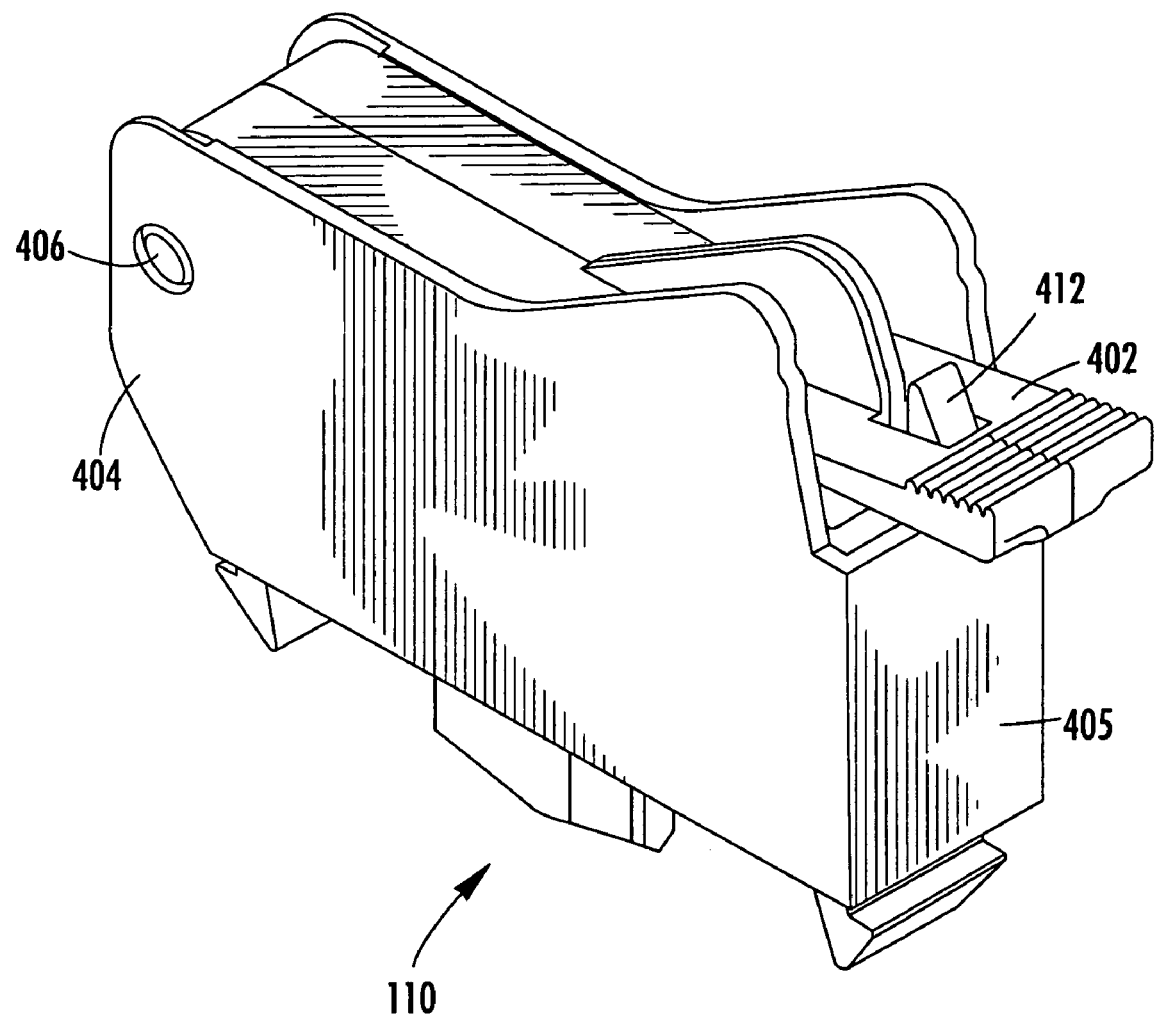

Referring now to the embodiments illustrated in FIG. 5A and FIG. 5B of a service module according to the present invention, the service module 110 is shown in an open position in FIG. 5A and a closed position in FIG. 5B. The service module 110, as illustrated in the embodiments of FIG. 5A and FIG. 5B, includes a base portion 400 which defines a conductor chamber and a cover 402 which is rotatably connected to the base portion 400 as shown in FIGS. 5A and 5B, the cover 402 is rotatably connected to an end 404 of the base portion 400 by a hinge 406. As can be seen in FIG. 5A, when the cover is rotated to the open position, openings 408, 410 are provided to allow customer service wires 409 to be passed into passageways in the cover 402. The cover 402 may be latched in a closed position by the latch 412.

Referring now to the illustrations of FIGS. 6, 7, 8A and 8B generally, further embodiments of a service module 110, 210 according to the present invention will be further described. As shown for the illustrated embodiments in FIGS. 6 and 7, the service module 210 includes a base portion 500 defining a conductor chamber 501 and a cover 502 rotatably connected to an end 504 of the base portion 500 on a top portion 505 thereof. As shown in the figures, the cover 502 rotatably connects to the hinge 506 with a bracket 508.

Figure 6:
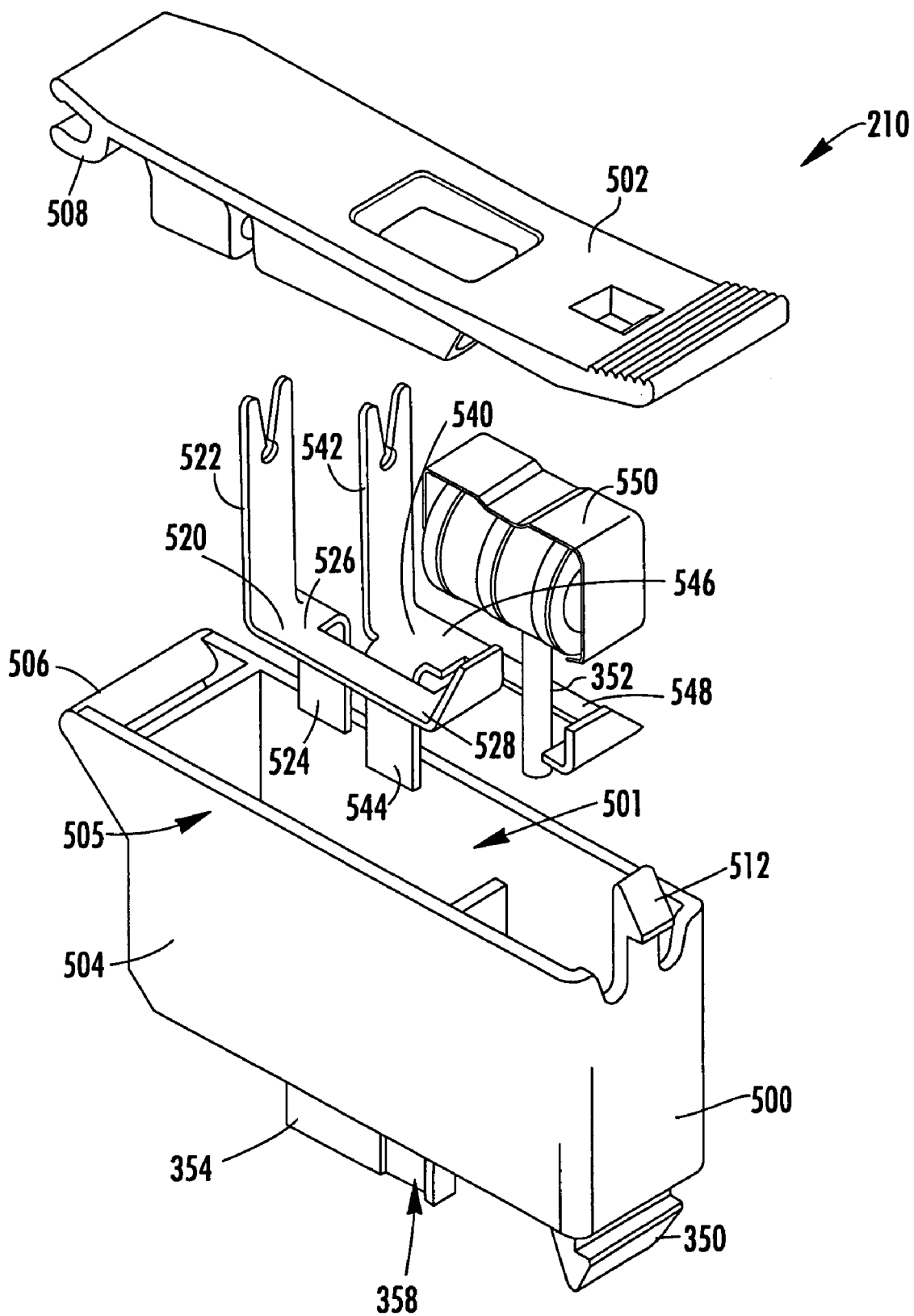
FIG. 6 is an exploded perspective view of a service module according to the present invention including a line protector device.

Longitudinally extending conductive members 520 and 540 are also illustrated. As shown, longitudinally extending conductive member 520 includes a service wire connector 522 at a first end thereof positioned to receive customer telecommunication conductors, such as the customer service wires 409, and a contact member 524 at a second end thereof. A connecting portion 526 connects the service wire connector 522 and the contact member 524 that respectively extend longitudinally in opposite directions and at right angles thereto. In addition, a circuit connector 528 extends from the connector portion 526. Similarly, the member 540 includes a service wire connector 542, a contact member 544 and a circuit connector 548. An electrical device 550, such as a line protector (for example, a gas tube or a varistor) may be positioned electrically connecting between the circuit connectors 528 and 548 to place an electrical device across the respective pair of tip and ring lines. The service wire connectors 522, 542 may be insulation displacing connectors as illustrated in FIG. 6.

Figure 7:
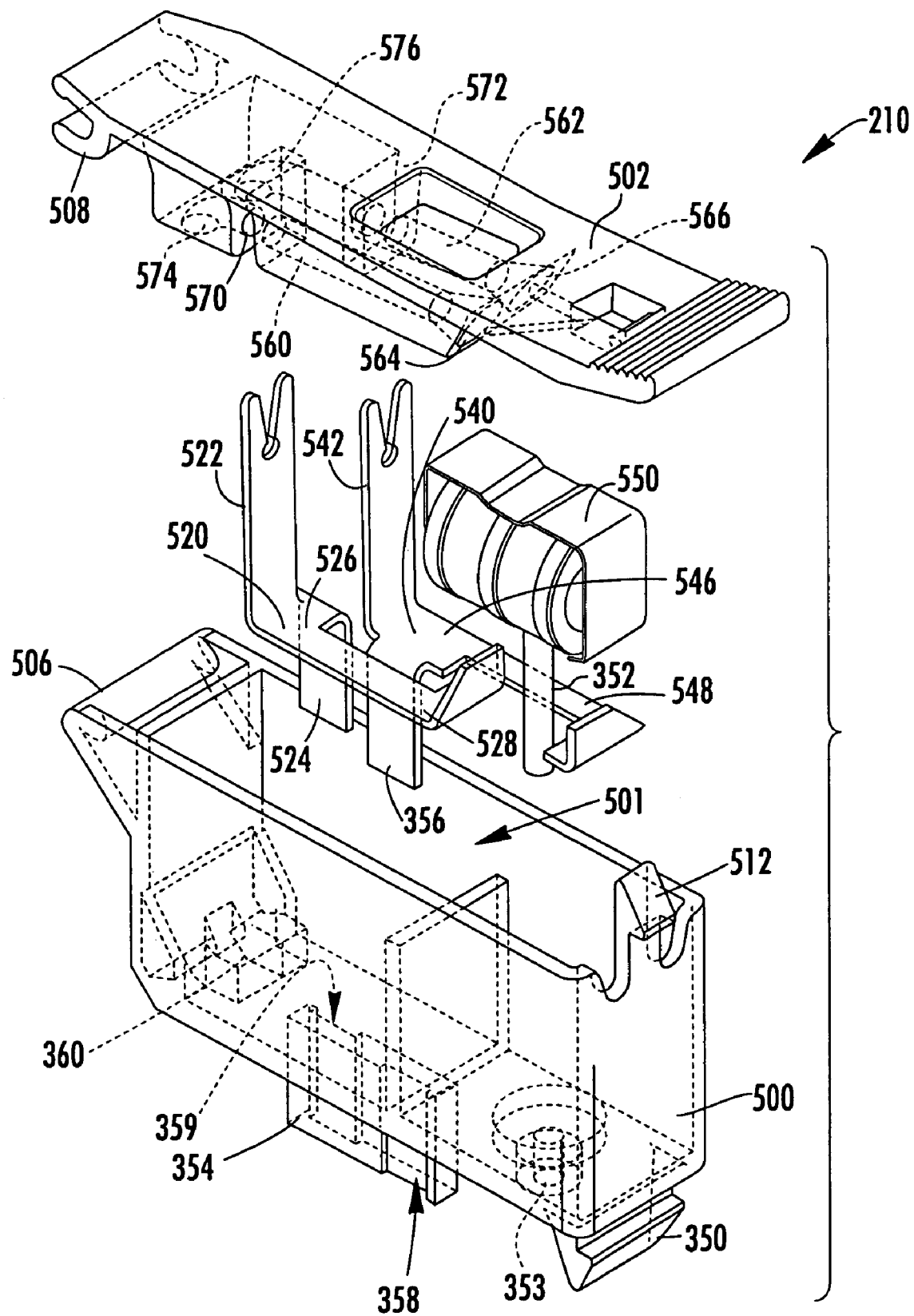
FIG. 7 is an exploded perspective view of the service module of FIG. 6 with a wall of the base portion removed.

The contact members 524, 544 may respectively make electrical connection with the member 300 and the member 304 (see FIG. 4) when the service module 210 is mounted to the base 207. The contact members 524, 544 may, thus, respectively electrically connect customer service wires placed in the service module 210 to the members 300, 304 respectively. For the illustrated embodiments, as best seen in FIG. 7, the contact member 524 is positioned in a slot 359 of the nonconductive member 354 while the contact member 544 is positioned in a slot 358 on an opposite surface of the nonconductive member 354. This configuration may provide for disconnection of the electrical connection between members 300 and 302 and members 304 and 306 respectively when the service module 310 is mounted to the base 207. Alternatively, electrical contact areas could be placed on opposing sides of the nonconductive member 354 to allow electrical connections to each of the members 300, 302, 304 and 306 to allow electronic circuitry to be placed in circuit to interrupt the electrical connection of the incoming and outgoing telecommunications conductor wires, such as wires 56 and 56' or wires 58 and 58'. Similarly, while shown as a conductive member in a channel of a nonconductive member, the contact members 524 and 544 may be provided as conductive coatings on a surface of the nonconductive member 354 and a connector, such as a spring loaded conductive member, may be provided to electrically connect the electrically conductive layers on the nonconductive member 354 to the service wire connectors 522, 542.

The service connectors 522, 542 are positioned in the chamber 501 and an environmental sealant, such as a gel, may be placed therein to facilitate environmental protection for the connections between the customer service wires and the service wire connectors 522, 542. An environmental sealant may also be placed in the elongate chamber 320 of the base 207 to facilitate environmental protection of connections between the members 300, 302, 304, 306 and the contact members 524, 544. An environmental sealant may also be placed in the chamber 326 of the base 207 to facilitate environmental protection of the connection between wires of the cable 205 and the respective connectors, such as connectors 322, 324. The environmental sealant may be a gel such as those disclosed in U.S. Pat. Nos. 4,634,207 and 4,864,725 which are incorporated herein by reference as if set forth in their entirety. As the connections to the conductor cable 205 generally need not be made and broken on a repeating basis, the environmental sealant in the chamber 326 need not be re-entrable. For example, a potting compound may be used.

The top cover 502, as shown in FIG. 7, includes passageways 560, 562 extending into the conducting chamber 501. The passageways have respective openings 564, 566 therein for receiving customer telecommunications conductor wires. The passageways 560, 562 are positioned in the cover 502 to pass the customer telecommunications conductor wires to the service wire connectors 522, 542. As shown in FIG. 7, slots 570, 572 define a portion of the conductor chamber 501 and are positioned relative to the service wire connectors 522, 542 so as to receive the service wire connectors 522, 542 therein when the cover 502 is rotated into a closed position on the base 500. Thus, customer service wires may be extended into the passageways 560, 562 and positioned in the slots 570, 572 so as to be driven into the insulation displacing connectors of the service wire connectors 522, 542 when the cover 502 is rotated into a closed position. As shown in FIG. 7, the passageways 560, 562 include stub ends 574, 576 at an end thereof to facilitate retaining the customer service wires in the passageway 560, 562 during establishment of electrical connections.

Figure 8A:
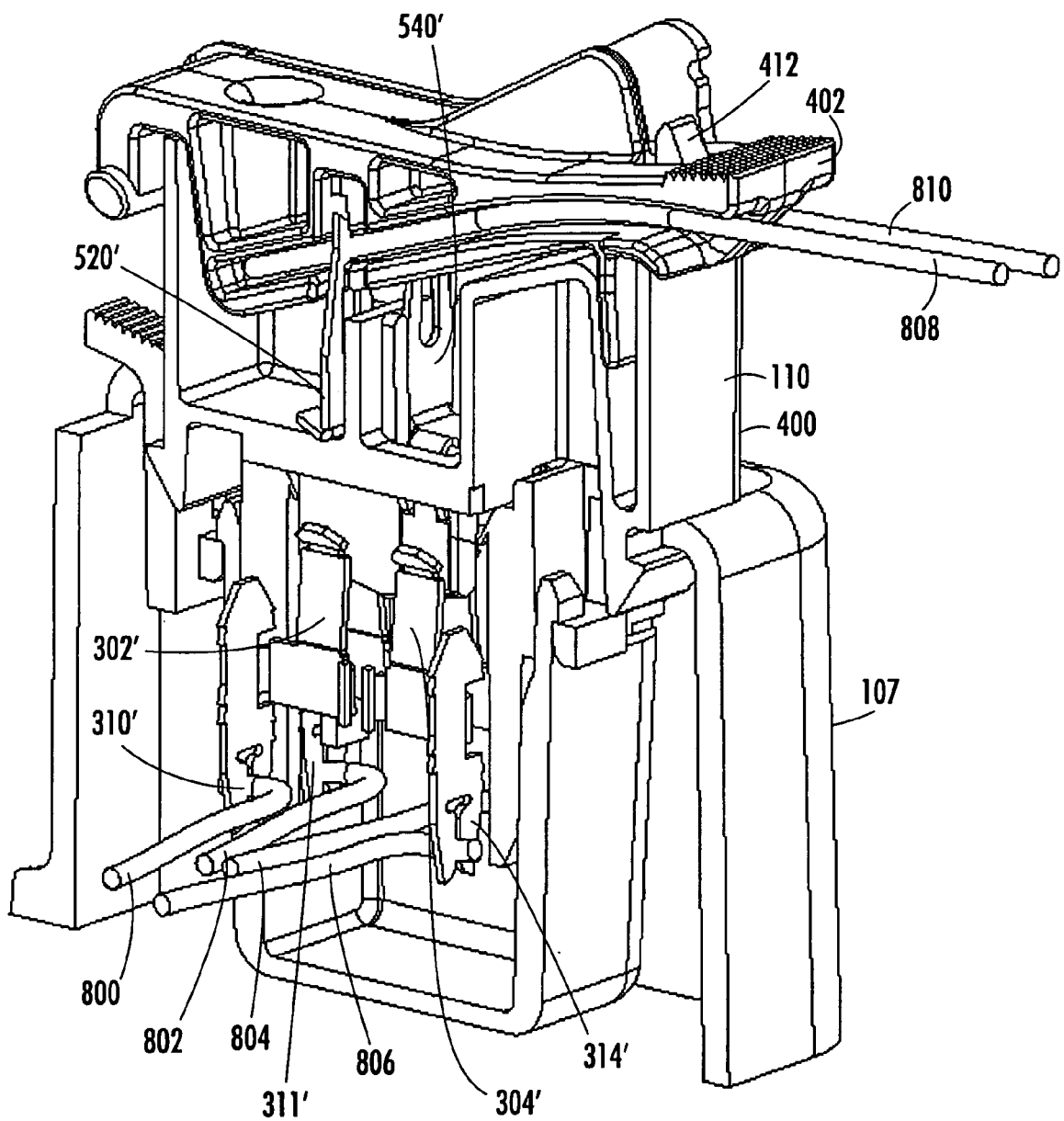
FIGS. 8A and 8B are cut-away perspective views of a telecommunications terminal block according to embodiments of the present invention with the service module mounted to the base and removed from the base respectively.
Figure 8B:
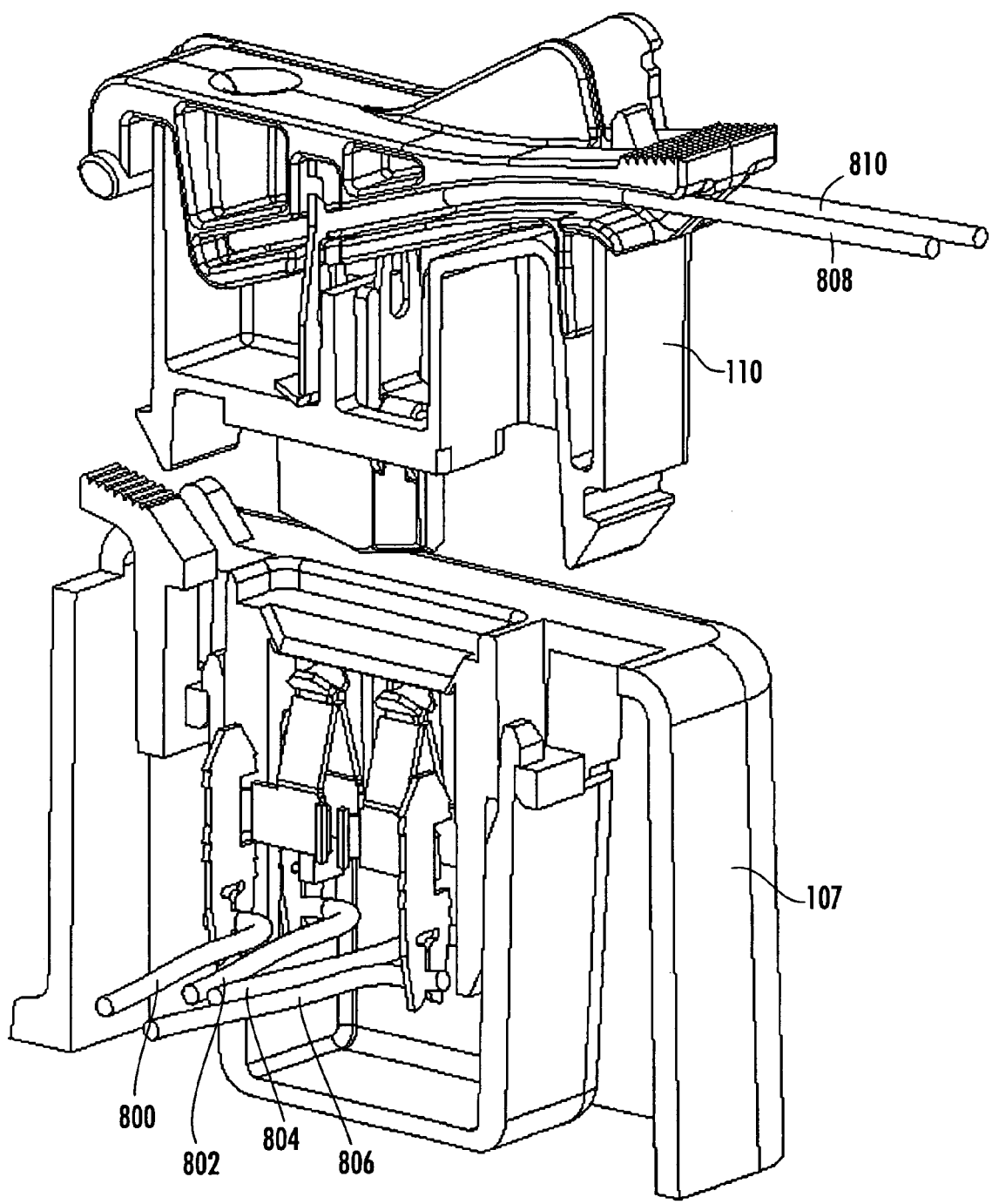

Referring now to the exploded perspective cut away views of FIGS. 8A and 8B, terminal blocks according to various embodiments of the present invention including a service module 110 configured to be removably mounted to the base 107 for making and breaking connections with a telecommunications conductor will now be further described. Service wires 808 and 810 are received in the service module 110. For purposes of the description herein, service wire 808 will be referred to as the ring line and service wire 810 will be referred to as the tip line. However, it is to be understood that the tip and ring lines may be interchanged and/or other telecommunications wires may be utilized. In a typical customer environment, the customer telecommunications conductor (or service) wires 808, 810 extend from the terminal block to the customer location, such as a telephone RJ11 jack or a network interface device (NID) typically mounted on the wall of a customer premise. A first, or tip, telecommunications conductor 806 and a first, or ring, telecommunications conductor 802 are received in the base 107, such as from an underground or above ground splice in a telecommunications conductor cable having multi-pair wires.

Tip and ring in lines 806, 802 are received in respective connectors 314', 311'. Connector 314' is on a first end of longitudinally extending conductive member 304' which, in turn, is placed in electrical contact with conductor 540' when the service module 110 is latched into the base 107 as described previously. Tip output line 804 and ring output line 800 are electrically connected to respective connectors (310' shown) and run from the base 107 to the respective splice location described previously with reference to the tip and ring in lines 806 and 802. Accordingly, as can be seen best with reference to FIG. 8B, when the module 110 is removed from the base 107, the respective tip in 806 and tip out 804 lines are electrically connected and the corresponding respective ring in 802 and ring out 800 lines are connected whereas, as illustrated in FIG. 8A, the in lines are connected to the customer service telecommunications wires 808, 810 and the connection to the tip and ring out lines are broken.

Figure 9A:
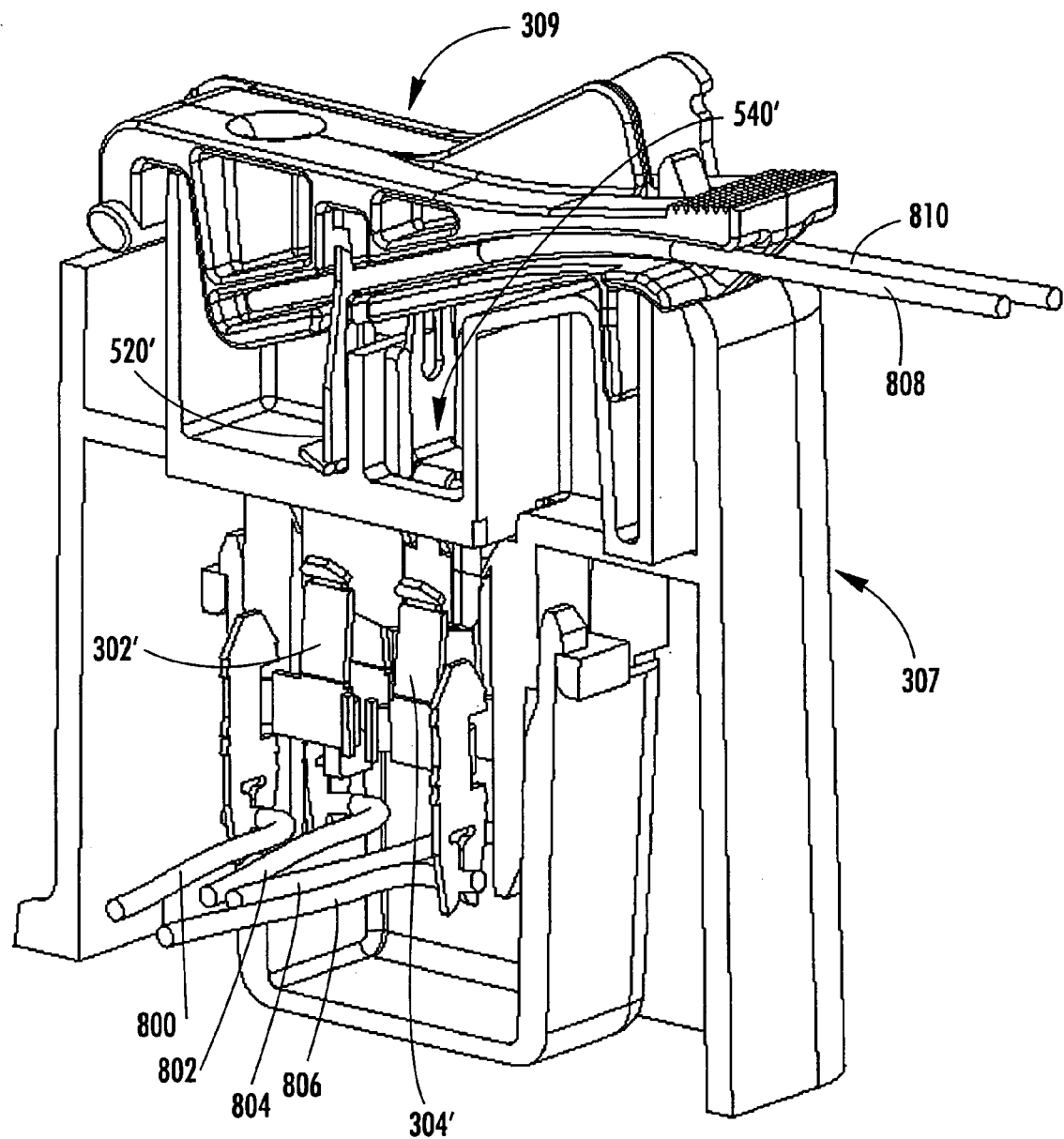
FIGS. 9A and 9B are cut-away perspective views of a telecommunications terminal block according to further embodiments of the present invention with the service module in a first position adjacent the base and a second position displaced from the base respectively.
Figure 9B:
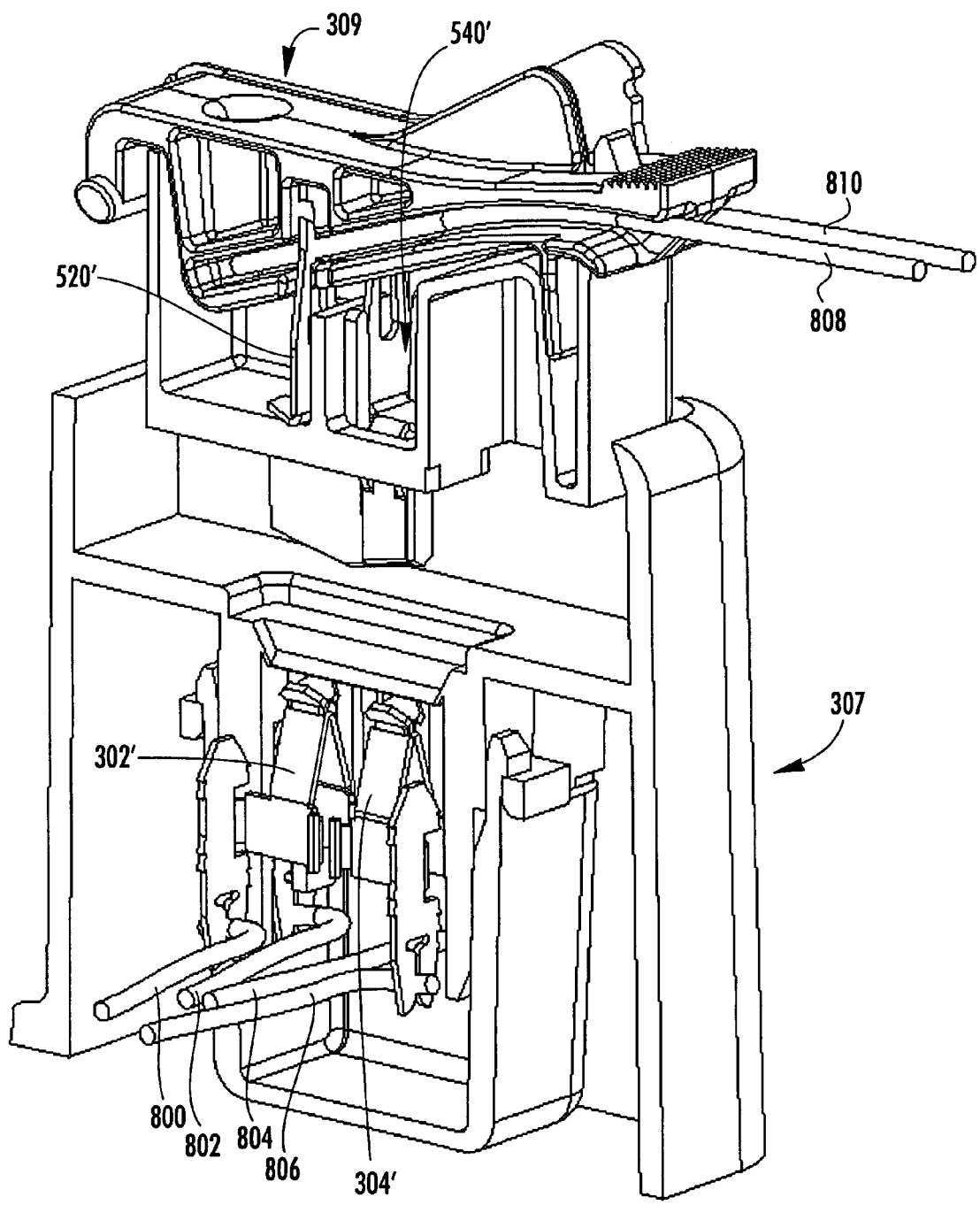

Further embodiments of the present invention are illustrated in the cross-sectional diagrams of FIGS. 9A and 9B. As with FIGS. 8A and 8B, the terminal blocks illustrated in FIGS. 9A and 9B are shown in an engaged and a disengaged position respectively. Like numbered components in FIGS. 9A and 9B operate as described previously with reference to FIGS. 6, 7, 8A and 8B and will not be described further herein. However, the embodiments illustrated in FIGS. 9A and 9B are movably mounted to the base 307 between a first position, as shown in FIG. 9A, and a second position, as shown in FIG. 9B. The electrical connection characteristics of the respective wires for the first position substantially correspond to the mounted position as illustrated in FIG. 8A and the second position substantially correspond to the removed position illustrated in FIG. 8B.

As shown in FIGS. 9A and 9B, the service module 309 is mounted in a chamber of the base 307 and longitudinally movable between an up position, as shown in FIG. 9B, and a down position, as shown in FIG. 9A, with the respective electrical connections to the tip and ring lines being substantially identical to those described previously with reference to FIG. 8A and FIG. 8B.

Figure 10A:
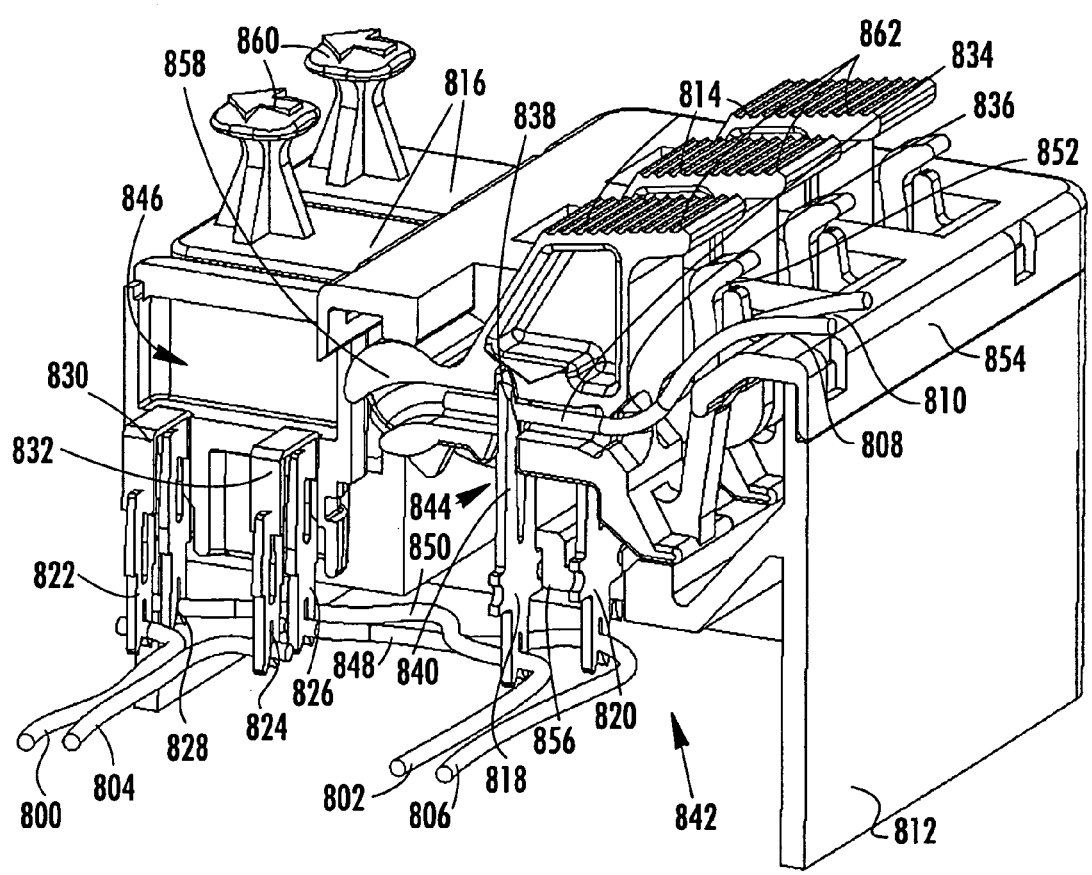
FIGS. 10A and 10B are cut-away perspective views of a telecommunications terminal block according to further embodiments of the present invention with a select module in a first position through connecting telecommunications conductor wires and a second position disconnecting the telecommunications conductor wires.
Figure 10B:
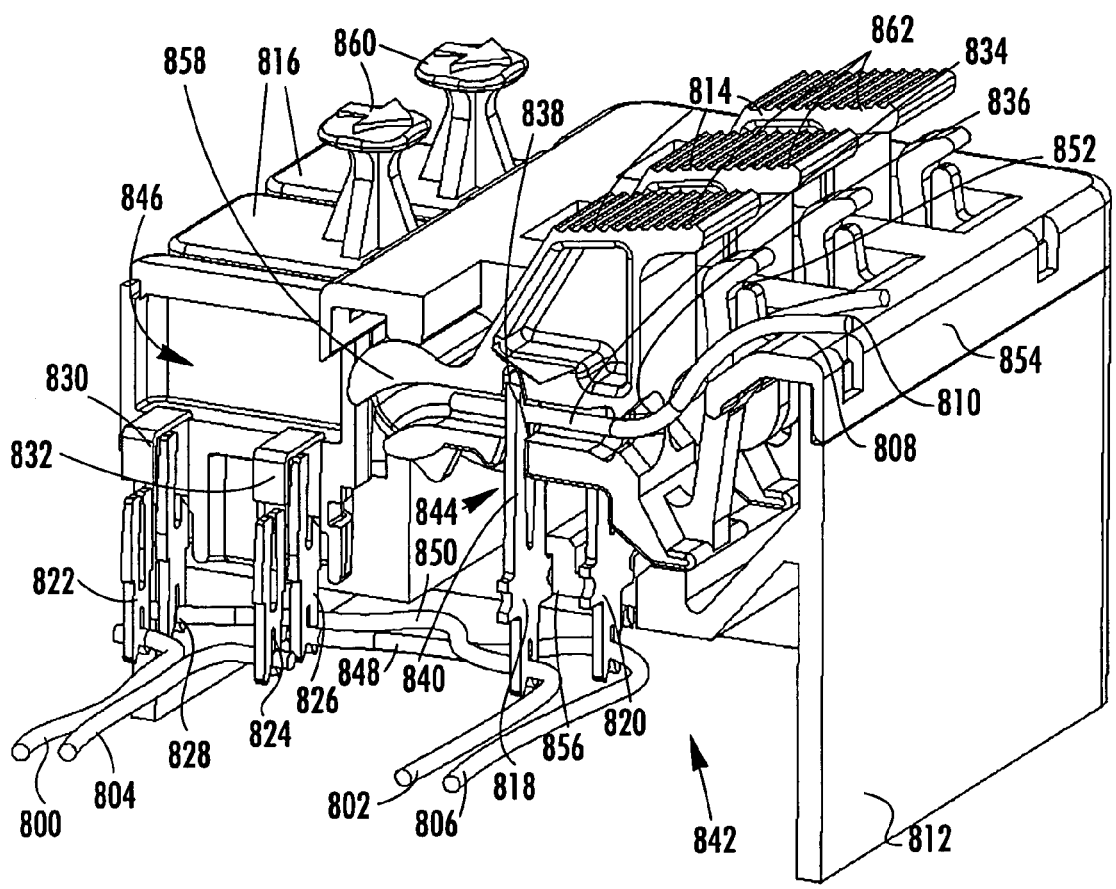
Figure 11A:
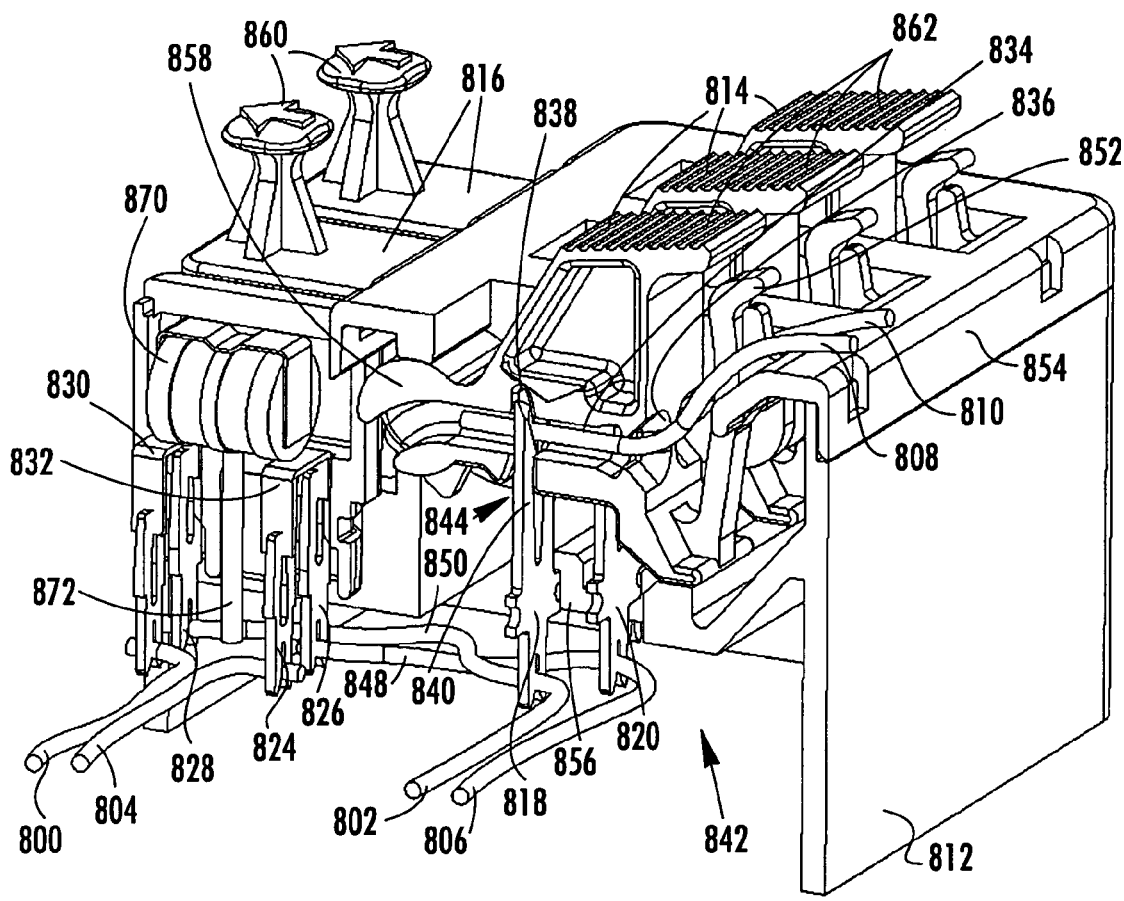
FIGS. 11A and 11B are cut-away perspective views of the telecommunications terminal block of FIGS. 10A and 10B including an electrical protection device with the select module in a first position through connecting telecommunications conductor wires and a second position disconnecting the telecommunications conductor wires.

Further embodiments of the present invention will now be described with reference to FIGS. 10A, 10B, 11A and 11B. FIGS. 10A and 10B differ from FIGS. 11A and 11B in the inclusion of an electrical protection device 870 and a ground connection 872 in the illustrations of FIGS. 11A and 11B. FIGS. 10A and 11A, respectively, show a first position, in which the respective telecommunications conductor in lines 802, 806 are electrically connected to corresponding telecommunications connector out lines 800, 804 while FIGS. 10B and 11B, respectively, show a second position in which the tip and ring output and input lines are electrically disconnected. Note that, in all of FIGS. 10A–11B, the customer service wires 808, 810 are electrically connected in the terminal block.

As shown in the figures, the terminal block includes a housing including a base 812 and a movably mounted service wire connector member 814 as well as a switch including a select module 816. A plurality of stations including select modules 816 in a second portion of the base 812 and service wire connector members 814 in a first portion of the base 812. Portions of three distinct termination stations are shown in FIGS. 10A, 10B, 11A, and 11B.

Tip in line 806 is received and electrically connected to connector 820 at a first end thereof and ring in line 802 is received and electrically connected to connector 818 at a first end thereof. The connector 820 is further electrically connected by a line 848 to an associated intermediate connector 826 and the connector 818 is connected by a line 850 to an associated intermediate connector 828. The intermediate connector 826, in turn, as illustrated in FIG. 10A connects through a jumper conductor 832 to the tip out connector 824 while the intermediate connector 828 is shown electrically connected by a jumper conductor 830 to the ring output connector 822. The ring out line 800 is connected to the ring out connector 822 and the tip out line 804 is connected to the tip out connector 824.

Each of the tip and ring in connectors 818, 820 provides a tip and ring conductor service wire connector portion on an opposite end thereof and electrically connected to the respective connector portions in the bottom of base 812 which receive tip in line 806 and ring in 802. The respective service wire connector portions, shown as insulation displacing connectors in the figures, are positioned on ends of the connectors 818, 820 to receive the customer telecommunication service wires 808, 810.

A switch assembly is provided by select modules 816 in combination with jumper conductors 830, 832 and intermediate connectors 826, 828. The intermediate connectors 826, 828 respectively are positioned adjacent the tip and ring output connectors 824, 828 in a second portion of the base 812 with the select module 816 positioned over the respective conductors 824, 826, 822, 828. The select module 816 has a first position electrically connecting the respective conductors 824, 826, 822, 828, as shown in FIG. 10A, and a second position as shown in FIG. 10B, wherein the respective connectors are not electrically connected.

The jumper conductors 830, 832 are mounted in the housing of the select module 816. As shown in the figures, the jumper conductors 830, 832 include long and short respective ends for providing an electrical connection to both of the connector pairs 824, 826 and 822, 828 in the FIG. 10A position while not making this electrical connection in the second position, as shown in FIG. 10B.

As is further illustrated in FIGS. 10A and 10B, the select modules 816 include handles 860 which include arrow designations wherein an arrow pointed out indicates a connection to the respective tip and ring out lines 804, 800 and an arrow designation facing in towards the service wire connector member 814 indicates the connection not being made to the output lines 800, 804.

The service wire connector member 814 is shown positioned in a second portion of the base 812 adjacent the first portion including the select module 816. The base 812 includes a chamber 844 which may include an environmental sealant material, such as a gel, to provide environmental protection to the service wire connection portions of the connectors 818, 820 which are positioned above the bottom wall 856 of the housing 812. Note that the top face of the bottom wall 856 defines an upper surface of the base 812 with reference to the service wire connector member 814 and the select module 816. In addition, a chamber 842 is defined by the base 812 which may be potted or otherwise environmentally sealed to provide environmental protection to the connections to the respective tip and ring in and output lines 800, 802, 804, 806 as well as the intermediate connections shown in FIGS. 10A, 10B, 11A, and 11B. An environmental sealant may further be provided in the chamber 846 defined by the housing of the select module 816 to provide environmental protection to the upper portion of the connectors 822, 824, 826, 828 and the jumper conductors 830, 832.

The service wire connector members 814, as shown in FIGS. 10A, 10B, 11A, and 11B, include a service wire passageway (834 shown) for each of the tip 810 and ring 808 service wires which passageway includes respective openings 836. In a rotated open position, the opening 836 is presented above the top 854 of the base 812 in a manner facilitating insertion of a service wire 808, 810 into the respective passageway through the corresponding opening. In the closed position illustrated as shown in FIGS. 10A, 10B, 11A, and 11B, a portion of the respective service wire receiving passageway 834, passes through the insulation displacing connector opening in the service wire connector portion of the connector 818 to establish an electrical connection therebetween when the service wire connector member 814 is rotated from the open, wire receiving position to the illustrated closed position. The service wire connecting member 814 further includes an actuation handle 862 and a latch mechanism 852. The base 812 further may include a cover 854 which defines an upper surface of the chamber 844.

As is clear from FIGS. 10A, 10B, 11A, and 11B, the service wire connector member 814 may be rotatably or otherwise removably mounted in the base 812 to provide for establishing a connection between the connectors 818, 820 and the service wires 808, 810. Furthermore, as shown by comparison between FIGS. 10A and 10B, the select module 816 may be provided with the first and second position being opposite orientations relative to the housing 812 such as the substantially 180° rotation between the two orientations shown in FIGS. 10A and 10B.

Figure 11B:
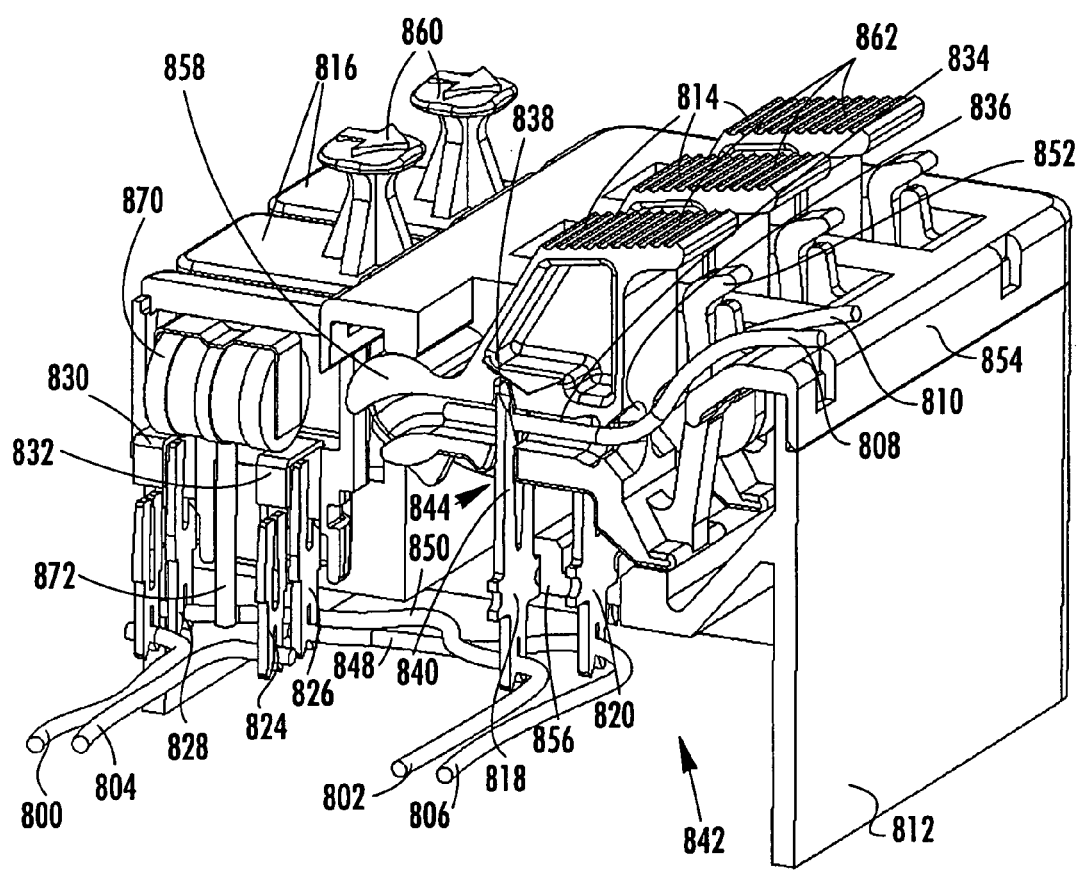
Figure 12:
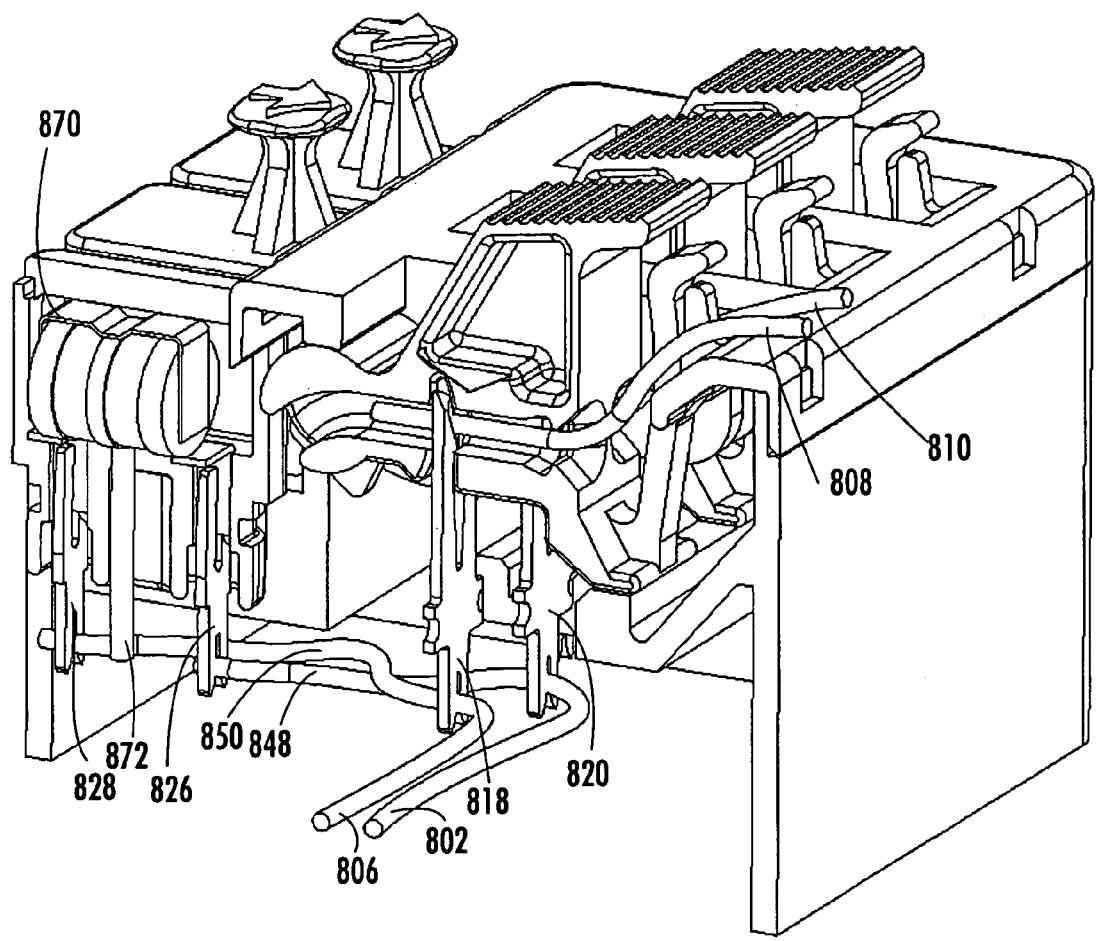
FIG. 12 is a cut-away perspective view of a telecommunications terminal block according to further embodiments of the present invention.

Referring now to FIGS. 11A and 11B, embodiments of the present invention including an electrical protection device 870 will be further described. A ground conductor 872 is provided in the portion of the base 812 adjacent the select module 816. The electrical protection device 870 is positioned in the chamber defined by the housing of the select module 816. As illustrated in FIG. 11A, electrical protection generally referred to as three point protection may be provided by a gas tube 870 having a terminal connected to each of the respective tip and ring lines through the respective intermediate portions of the jumper conductors 830 and 832 as well as a centrally disposed ground connection point to the ground conductor 872. The use of electrical protection devices such as gas tubes is generally known to those of skill in the art and will not be described further herein. Note that, as illustrated in FIG. 11B, the protection circuit is provided to the tip and ring input lines 802, 806 and the customer service wires 808, 810 but is not connected to the tip and ring output lines 804, 800. Note that FIG. 12 illustrates embodiments in which a protector is provided without tip and ring output lines being provided.

Figure 13:
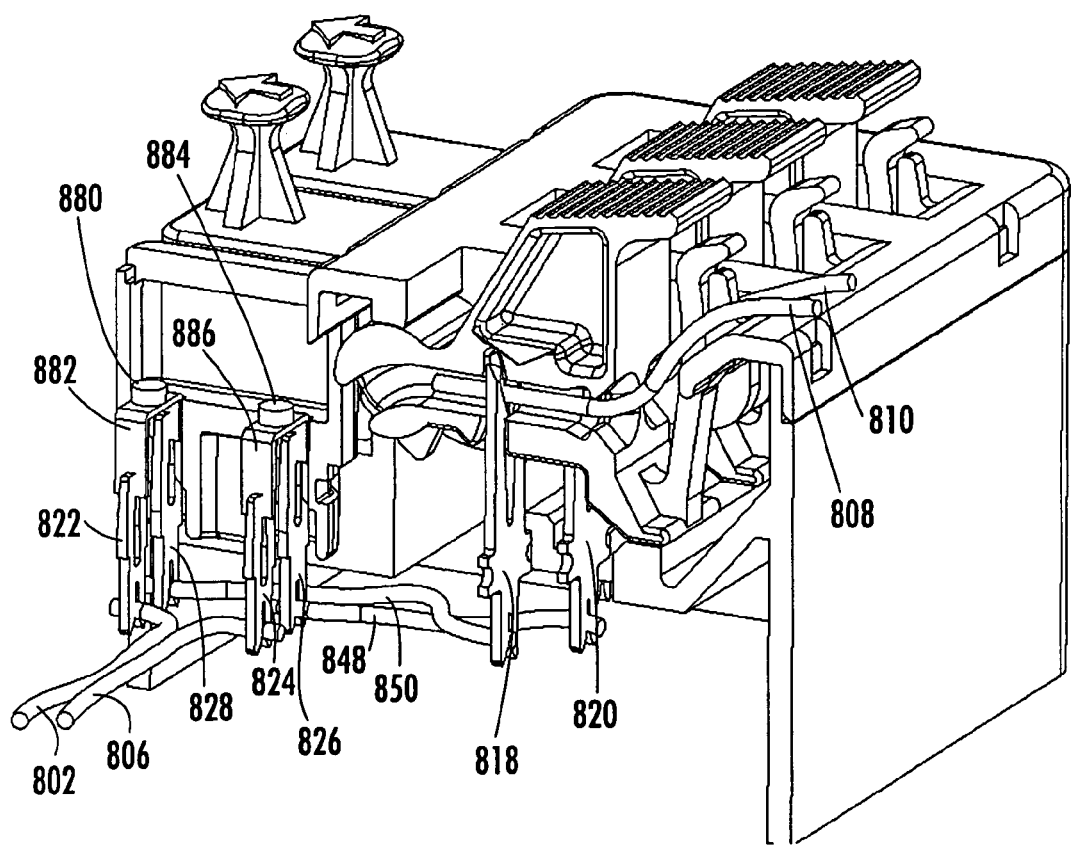
FIG. 13 is a cut-away perspective view of a telecommunications terminal block according to yet further embodiments of the present invention including an in-line electrical protection device.

Referring now to FIG. 13, further embodiments of the present invention providing a terminal block for making and breaking connections between a telecommunications conductor and a service wire will be described. As shown in FIG. 13, the tip input line 806 is electrically connected to the connector 824 while the ring input line 802 is connected to the connector 822. The connector 824 is, in turn, connected to the intermediate connector 826 through an electrical protection device 884 which is electrically connected between the respective connectors 824, 826 by a jumper conductor 886. Similarly, the electrical protection device 880 is electrically connected between the connectors 822 and 828 by a jumper conductor 882. Accordingly, the respective electrical protection devices 884 and 880 are placed in series on the respective tip and ring input lines 802, 806 which, in turn, connect through the electrical connection lines 848 and 850 to respective connectors 818, 820 and, thus, to the customer telecommunications service wires 808, 810. As a result, when combined with a three point protection device, such as the gas tube described previously, five point protection may be provided for the tip and ring telecommunications circuit.

The electrical protection devices 880, 884 may be fuse circuits, such as a fuse or a fusable link. Thus, under selected over-voltage or over-current conditions, in lieu of, or in addition to, a ground path through a device such as a gas tube, the connection of the incoming tip and ring lines to the customer service wires may be opened. Note that the common elements of the terminal block illustrated in FIG. 13 otherwise operate substantially as described previously with respect to FIGS. 10A, 10B, 11A, 11B and 12 and will not be further described herein.

Figure 14:
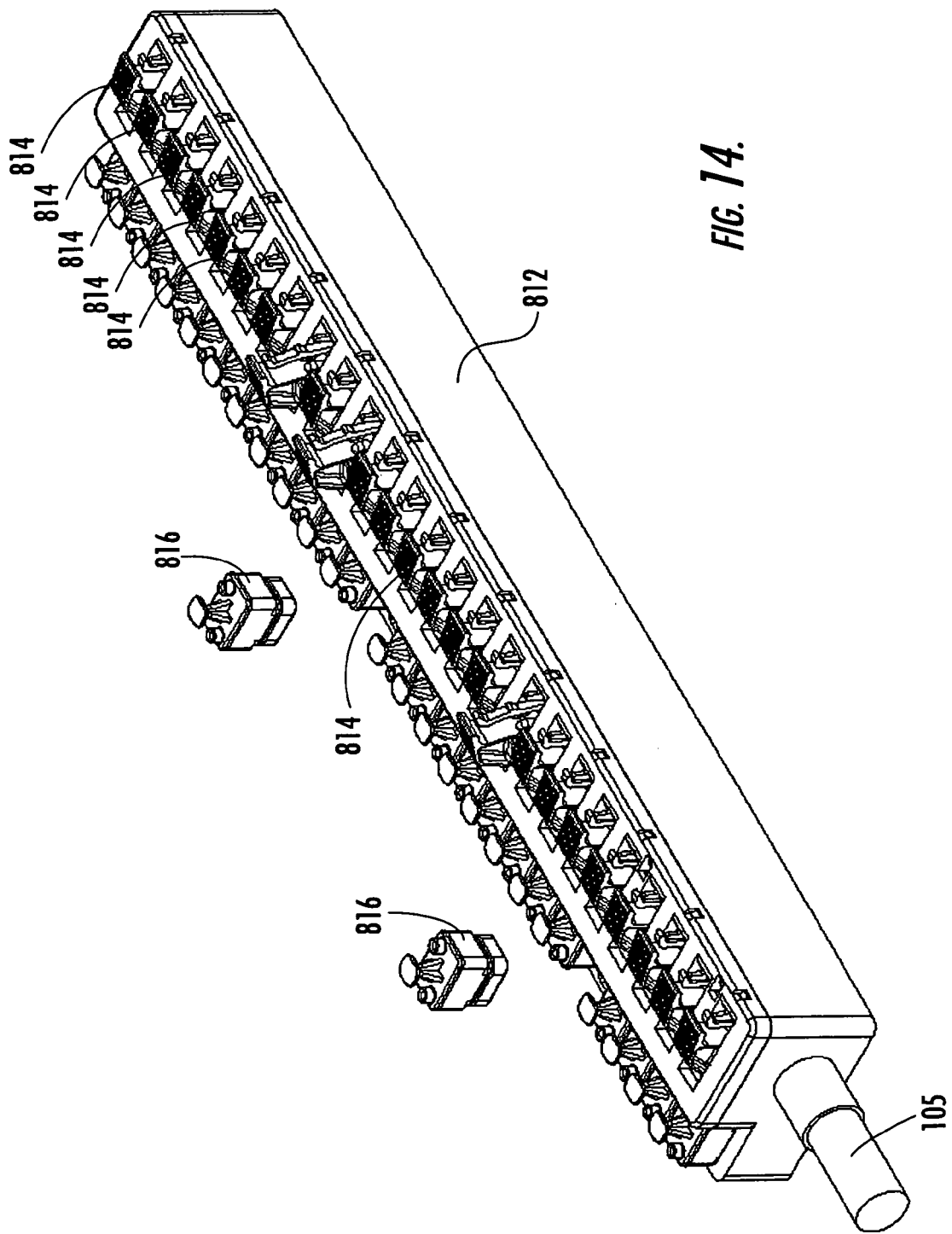
FIG. 14 is an exploded perspective view of a 25 station telecommunications terminal block according to embodiments of the present invention.
Figure 15:
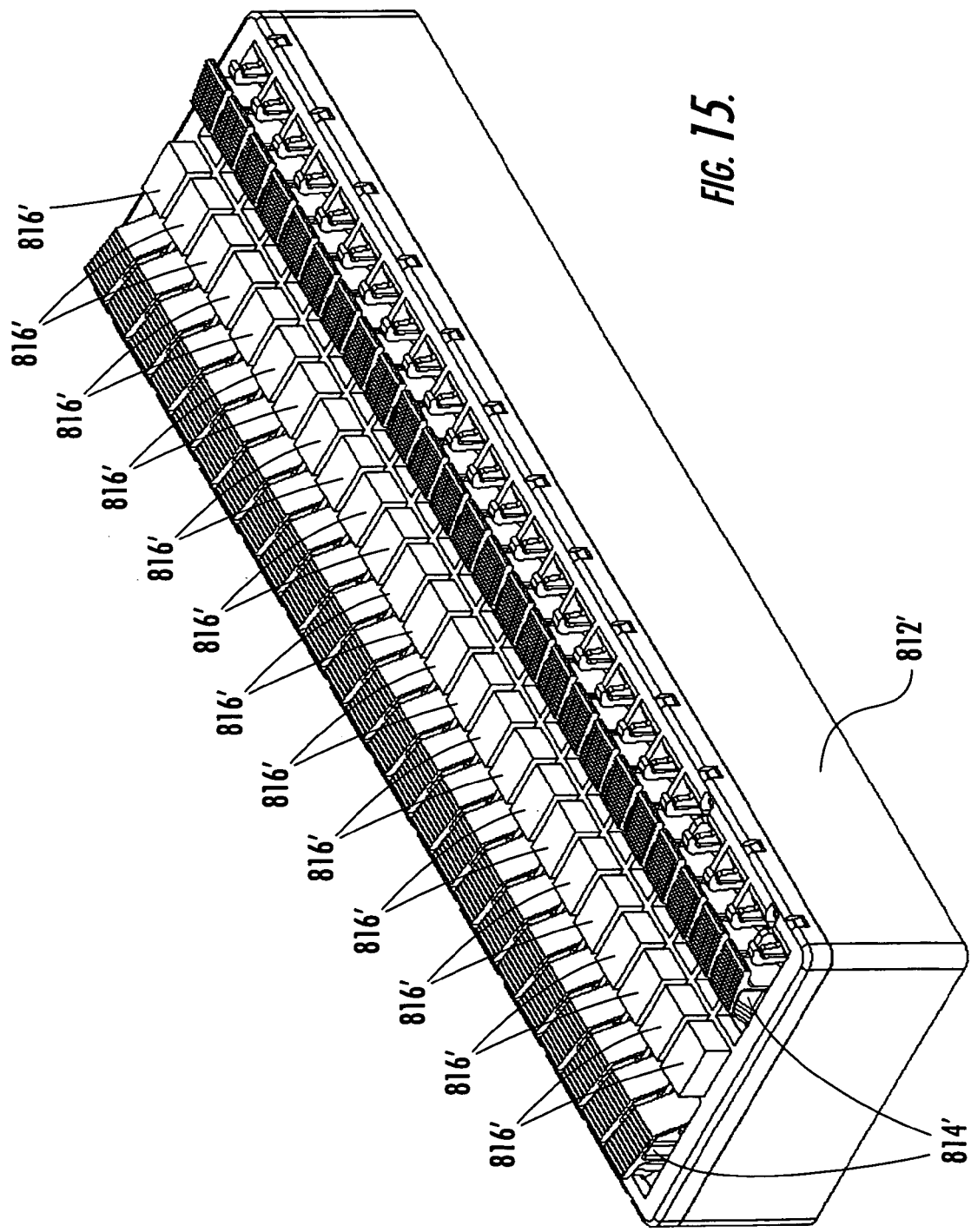
FIG. 15 is an exploded perspective view of a 50 station telecommunications terminal block according to embodiments of the present invention.

Referring now to FIG. 14, an exploded perspective view is provided showing a multi-station terminal block according to embodiments of the present invention including a plurality of termination stations along the elongate axis defined by the base 812 to support a plurality of wire pairs from the telecommunications conductor cable 105. The respective service wire connector members 814 and select modules 816 operate generally as described previously with respect to various embodiments. As shown in FIG. 14, a total of 25 termination stations are provided, each supporting one tip and ring wire pair. A further embodiment is illustrated in FIG. 15 wherein a 50 pair cable may be supported by 50 respective service wire connector members 814', pairs of which are supported by a respective one of 25 select module stations 816' positioned in the base 812'.

Yet further embodiments of the present invention will now be described with reference to FIGS. 16A and 16B. The service wire connector member 914 is configured to receive the customer telecommunications service wires 808, 810 in substantially the manner described previously with reference to FIGS. 10A and 10B so as to provide an electrical connection to the service wire connector portions of the respective connectors 818 and 820 mounted in the base 912. The tip and ring in lines 806, 802 are connected at connection portions on a first end of the respective connectors 818, 820 in a lower chamber, defined by the housing 912, which may be environmentally sealed, such as by potting. A jumper connection 918 between one of the connectors 818 and an intermediate connection point 920 is shown in the figures. A similar connection would be provided for the connector 820. The intermediate connector 920 has an associated ring line output connector 926 (see also tie line connector 931) which, in turn, is connected to the respective ring output line 804 (see also tie output line 800). The intermediate switch portion 922 provides a selectable electrical connection between the intermediate connector 920 through the conductive member 924 to connect through the connector 926 to the ring output line 804. The tip output line 800 is similarly connected through intermediate switch portion 928.

Figure 16A:
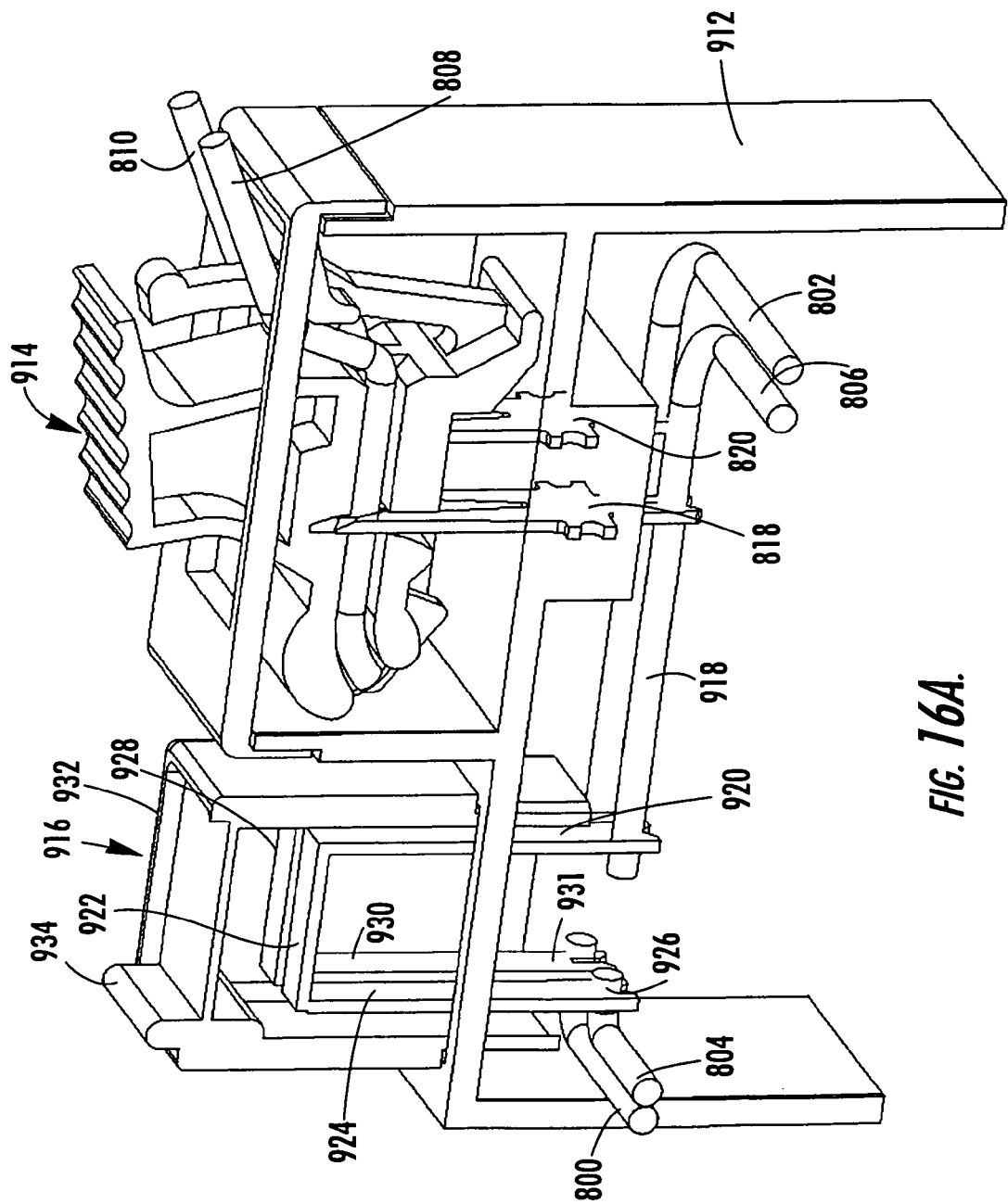
FIGS. 16A and 16B are cut-away perspective views of a telecommunications terminal block according to further embodiments of the present invention with a select module in a first position through connecting telecommunications conductor wires and a second position disconnecting the telecommunications conductor wires.
Figure 16B:
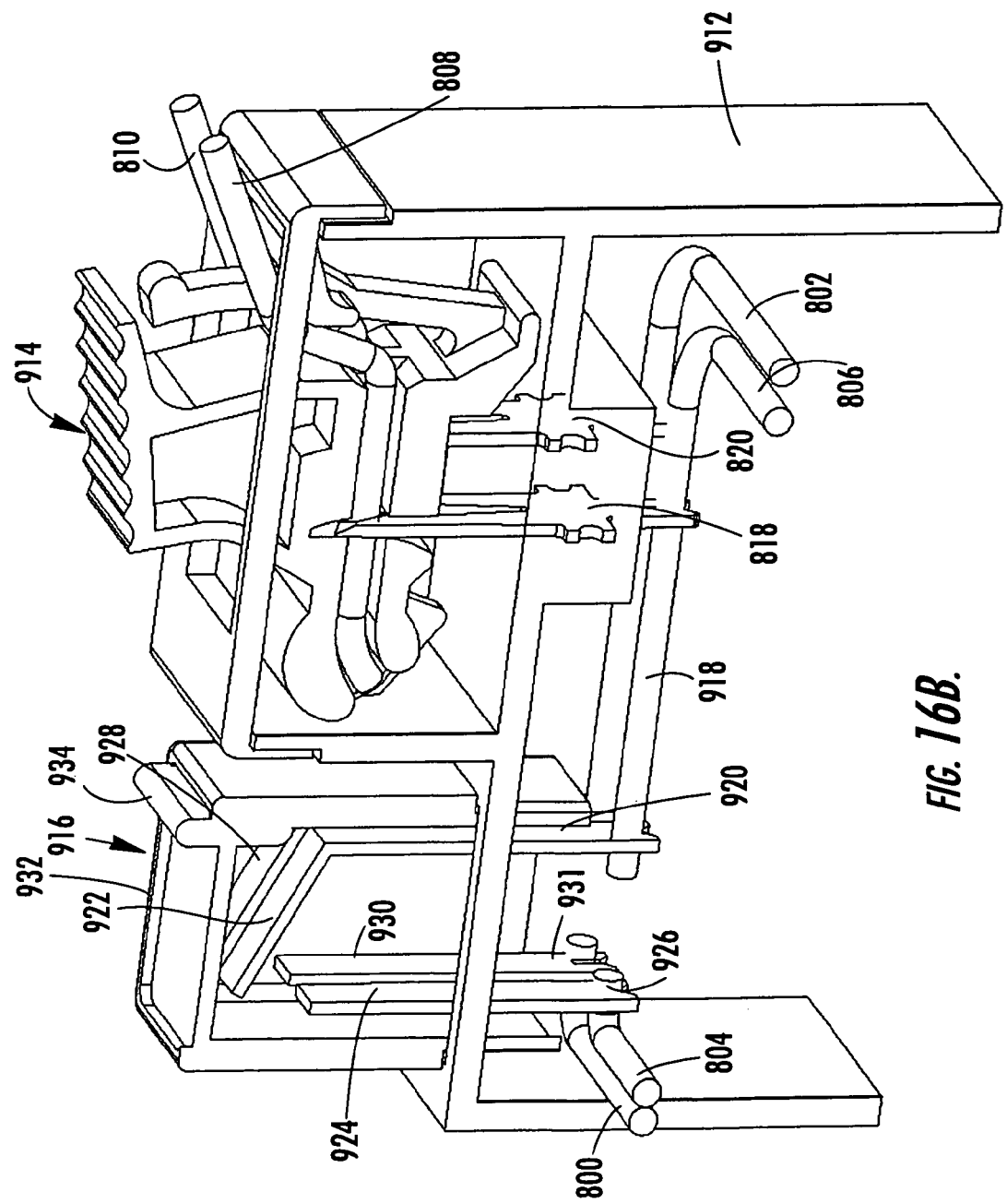

As shown in FIG. 16A, the select module 916 providing the switch for the illustrated terminal block includes a housing 932 and an actuator 934. The transition between the input and output connected configuration shown in FIG. 16A and the open configuration shown in FIG. 16B may be provided, for example, by a slidable actuator configuration of actuator 934 or by a removable housing 932 which may be reinserted in a 180° rotated position in which the intermediate members 922, 928 are allowed to move, for example, due to a spring pre-load, to an open position breaking the electrical connections when an actuator lip 934 is moved to the opposite end and out of contact with the intermediate switch portions 922, 928.

Figure 17B:
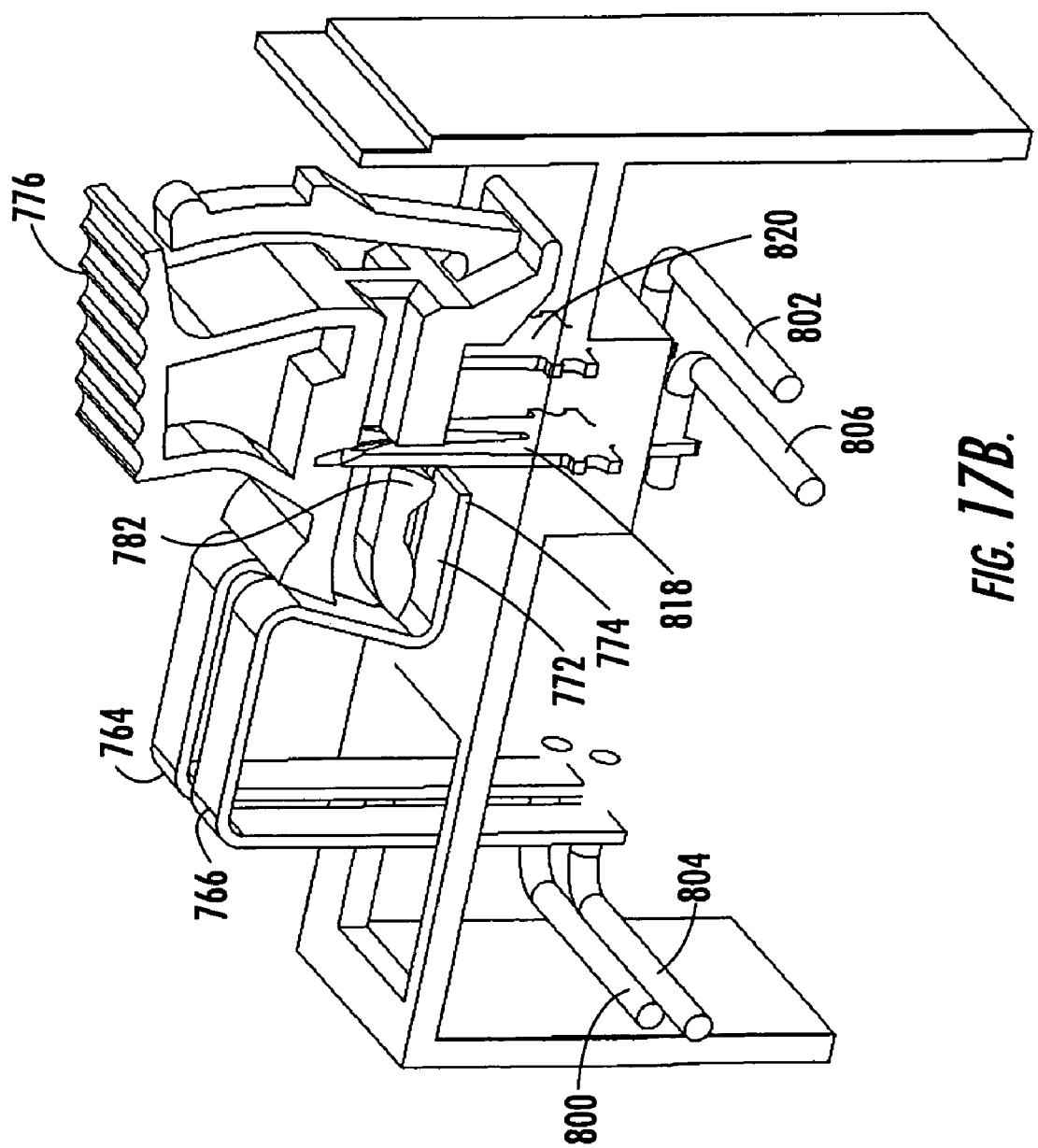

Referring now to FIGS. 17A and 17B, further embodiments of terminal blocks according to the present invention will now be described. The terminal block includes a base 750 including tip and ring in connectors 820, 818 mounted in a first portion thereof and extending from an upper surface of the base 750. A respective tip and ring output connector 766, 768 is mounted in the second portion of the base 750. The movably mounted service wire connector member 776 is positioned adjacent the upper surface of the base 750 in the first portion. The service wire connector member 776, as shown in FIG. 17A, is pivotally mounted and includes a latch 778 as well as a service wire receiving passageway 779 having an opening 781 and a slot portion 780 crossing the passageway 779. The service wire receiving passageway 779 and opening 781 and slot 780 for receiving the connector 818 operate substantially as described previously with reference to FIG. 10A.

A contact member 770 extends from the output connector 768 in the second portion of the base 750 and extends from the base 750 to a second end 772 having a contact point 774 at an end thereof which is, as shown in FIG. 17A, positioned in contact with the service wire connector portion of the connector 818. An actuator 782 is positioned in the service wire connector member 776 so as to allow the contact member 770 to contact the connector 818 in the position illustrated in FIG. 17A and to break the contact between the contact member 770 and the connector 818 in the position of the service wire connector member 776 illustrated in FIG. 17B. As shown in FIGS. 17A and 17B, the actuator 782 is provided as a cam surface with a sloped portion engaging connector 818 to displace it from the contact point 774 of the contact member 770 as illustrated in FIG. 17B while allowing the connector 818, for example, through spring loading, to return into engagement with the contact point 774 in the position shown in FIG. 17A. Accordingly, insertion of customer service wires into the passageway 779 and rotation of the service wire connector member 776 into the closed position both establishes a connection between the input lines 802, 806 and the customer service wires 808, 810 and breaks the connection between the respective input 802, 806 and output 800, 804 lines.

Figure 18:
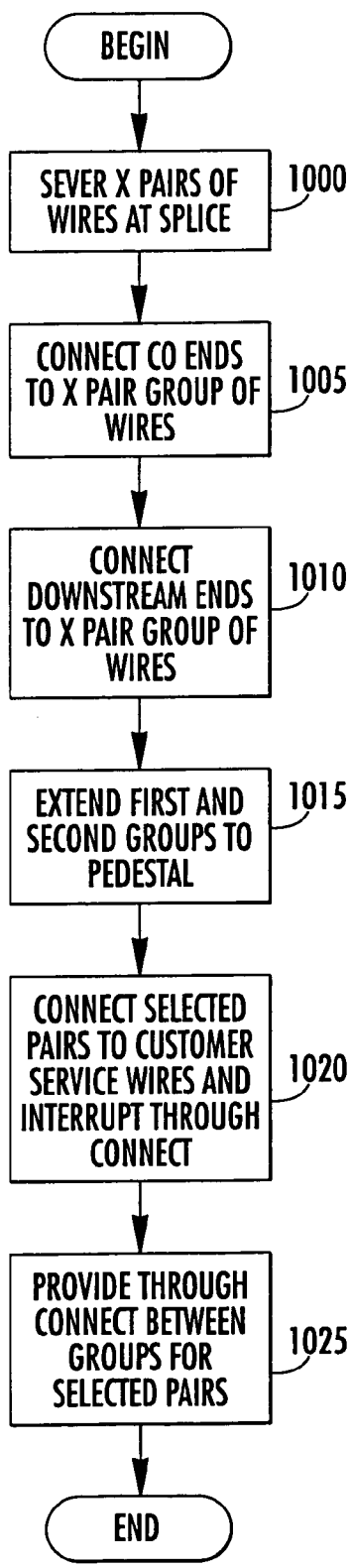
FIG. 18 is a flowchart illustrating operations for making and breaking connections with a telecommunications conductor according to embodiments of the present invention.

Operations for making and breaking connections with a telecommunications conductor according to embodiments of the present invention will now be described with reference to the flowchart illustration of FIG. 18. It is to be understood that, while the methods of the present invention may be accomplished utilizing the terminal blocks of the present invention, other hardware may be utilized in keeping with the methods of the present invention.

Operations begin at block 1000 when X pairs of telecommunications conductor wires from a telecommunications conductor cable extending from a central office facility are severed, for example, at a splice. X pairs may be 25 pairs for a typical application utilizing a telephone company pedestal. The telecommunications conductor cable has more than X pairs of telecommunications conductor wires. A first end of the severed X pairs of telecommunications conductor wires, such as the end connected to a telephone company central office, is connected to a first group of X pairs of wires (block 1005). The second end of the severed X pairs of telecommunications conductor wires is connected to a second group of X pairs of wires, such as those extending downstream away from the central office (block 1010). The first and second group of X pairs of wires are extended to a telecommunications customer service wire junction box, such as a telephone company pedestal (block 1015).

Ones of the first group of X pairs of wires are selectively connected to at least one of a pair of customer service wires or one of the second group of X pairs of wires in the customer service wire junction box as will be described for particular embodiments with reference to blocks 1020 and 1025. As shown in FIG. 18 selective connecting operations may include connecting selected ones of the first group of X pairs of wires to a pair of customer service wires and leaving corresponding ones of the second group of X pairs of wires disconnected from ones of first group of X pairs of wires which are connected to a pair of customer service wires to interrupt the through connection (block 1020). Corresponding ones of the second group of X pairs of wires may be connected to ones of first group of X pairs of wires which are not connected to a pair of customer service wires (block 1025).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope That which is claimed:

1. A telecommunications terminal block for making and breaking connections with a telecommunications conductor, said terminal block comprising:
   a base having a first connector and a second connector mounted therein;
   a first conductor extending from the base, the first conductor being electrically connected to the first connector;
   a second conductor extending from the base, the second conductor being electrically connected to the second connector; and
   a service module configured to be removably mounted to the base, the service module comprising:
      a service wire connector configured to receive a customer telecommunications conductor; and
      a contact member that electrically connects the service wire connector to the first conductor when the service module is mounted to the base;
   wherein the first conductor and the second conductor are configured so as to electrically connect the first connector and the second connector when the service module is removed from the base and wherein the service module is configured to interrupt the electrical connection of the first connector and the second connector when the service module is mounted to the base and wherein the service wire connector is configured to connect the customer telecommunications conductor to the first conductor through the contact member when the service module is mounted to the base.

2. The terminal block of claim 1 wherein the contact member is configured to disconnect the electrical connection of the first connector and the second connector when the service module is mounted to the base.

3. The terminal block of claim 2 wherein the service wire connector comprises a first end of a longitudinally extending conductive member positioned to receive the customer telecommunications conductor and wherein the contact member comprises a second end of the longitudinally extending conductive member, the second end of the longitudinally extending conductive member contacting the first conductor when the service module is mounted to the base.

4. The terminal block of claim 3 wherein the service module further comprises a conductor chamber and the service wire connector is positioned in the conductor chamber.

5. The terminal block of claim 4 wherein the service module further comprises a passageway extending into the conductor chamber having an opening for receiving the customer telecommunications conductor and positioned to pass the customer telecommunications conductor to the service connector.

6. The terminal block of claim 3 wherein the first conductor is positioned adjacent to the second conductor so as to contact the second conductor when the service module is removed from the base.

7. The terminal block of claim 6 wherein the service module further comprises a nonconductive member positioned to pass between the first conductor and the second conductor when the service module is mounted to the base and wherein the first conductor and the second conductor comprise a spring clip.

8. The terminal block of claim 7 wherein the nonconductive member extends from a bottom surface of the service module adjacent the base.

9. The terminal block of claim 7 wherein the contact member comprises:
   an electrically conductive layer on a surface of the nonconductive member adjacent the first conductor when the service module is mounted to the base; and
   a connector that electrically connects the electrically conductive layer to the service wire connector.

10. The terminal block of claim 7 wherein the nonconductive member includes a channel in a surface thereof adjacent the first conductor when the service module is mounted to the base and wherein the contact member is received in the channel of the nonconductive member.

11. The terminal block of claim 10 wherein the first connector comprises a first end of a second longitudinally extending conductive member and the first conductor comprises a second end of the second longitudinally extending conductive member and wherein the second connector comprises a first end of a third longitudinally extending conductive member and the second conductor comprises a second end of the third longitudinally extending conductive member.

12. The terminal block of claim 10 wherein the service wire connector is an insulation displacing connector.

13. The terminal block of claim 12 wherein the service module further comprises:
   a base portion defining a conductor chamber;
   a cover movably connected to a first end of the base portion on a top portion thereof displaced from the base of the terminal block; and
   a passageway in the cover extending into the conductor chamber, the passageway having an opening on a second end of the cover opposite the first end for receiving the customer telecommunications conductor, the passageway being positioned to pass the customer telecommunications conductor to the insulation displacing connector; and
   wherein rotation of the cover to a closed position connects the customer telecommunications conductor to the insulation displacing connector.

14. The terminal block of claim 13 wherein the base is elongate and defines a first axis and wherein the first spring clip is positioned adjacent and laterally offset from the second spring clip with reference to the first axis and wherein a plurality of service modules are removably mounted to the elongate base along the first axis.

15. The terminal block of claim 14 wherein the base includes an elongate chamber and wherein the first spring clip and the second spring clip are positioned in the elongate chamber.

16. The terminal block of claim 15 further comprising an environmental sealant in the elongate chamber and in the conductor chamber.

17. The terminal block of claim 14 wherein the plurality of service modules further comprise clip members and the elongate base further comprises a plurality of clip receptacles spaced along the first axis and configured to receive the clip members to mount the service modules to the elongate base.

18. The terminal block of claim 14 wherein the service module further comprises:
   a conductor chamber; and
   an environmental sealant in the conductor chamber;

wherein the service wire connector and the second service wire connector are positioned in the conductor chamber.

19. The terminal block of claim 10 wherein the terminal block further comprises:
   a third connector and a fourth connector mounted in the base;
   a third conductor extending from the base, the third conductor being electrically connected to the third connector;
   a fourth conductor extending from the base, the fourth conductor being electrically connected to the fourth connector, the fourth conductor and the third conductor comprising a second spring clip; and
   wherein the service module further comprises:
      a second service wire connector configured to receive a second customer telecommunications conductor; and
      a second contact member that electrically connects the second service wire connector to the third conductor when the service module is mounted to the base;
      wherein the second spring clip electrically connects the third connector and the fourth connector when the service module is removed from the base and wherein the second contact member is configured to electrically disconnect the first connector and the second connector when the service module is mounted in the base.

20. The terminal block of claim 19 wherein the nonconductive member includes a second channel in a surface thereof adjacent the third conductor when the service module is mounted to the base and wherein the second contact member is received in the second channel of the nonconductive member.

21. The terminal block of claim 20 wherein the second channel and the first channel are in opposite surfaces of the nonconductive member.

22. The terminal block of claim 20 wherein the first and second customer telecommunications conductors are tip and ring lines.

23. The terminal block of claim 22 wherein the service module further comprises a line protector electrically connected between the first conductor and the third conductor when the service module is mounted to the elongate base.

24. The terminal block of claim 19 wherein the second service wire connector comprises a first end of a fourth longitudinally extending conductive member positioned to receive the second customer telecommunications conductor and wherein the second contact member comprises a second end of the fourth longitudinally extending conductive member, the second end of the fourth longitudinally extending conductive member contacting the third conductor when the service module is mounted to the base.

25. The terminal block of claim 24 wherein the first longitudinally extending conductive member further comprises a circuit connector and the fourth longitudinally extending conductive member further comprises a second circuit connector, the circuit connector and the second circuit connector being positioned to receive an electrical device therebetween.

26. The terminal block of claim 1 wherein the service module further comprises a circuit contact member that electrically connects to the second conductor when the service module is mounted to the base, the circuit contact member being configured to electrically connect an electrical device between the first connector and the second connector.

27. The terminal block of claim 1 wherein the terminal block further comprises a chamber including an environmental sealant that protects the electrical connection of the first connector and the second connector.

28. The terminal block of claim 27 wherein the environmental sealant is a gel.

29. A telecommunications terminal block for making and breaking connections with a telecommunications conductor, said terminal block comprising:
   a base having a first connector and a second connector mounted therein;
   a first conductor extending from to the base, the first conductor being electrically connected to the first connector;
   a second conductor extending from the base, the second conductor being electrically connected to the second connector; and
   a service module configured to be movably mounted to the base for movement between a first position adjacent the base and a second position displaced vertically from the base, the service module comprising:
      a service wire connector configured to receive a customer telecommunications conductor; and
      a contact member that electrically connects the service wire connector to the first connector when the service module is in the first position;
   wherein the first connector and the second connector are configured so as to electrically connect the first conductor and the second conductor when the service module is in the second position and wherein the service module is configured to interrupt the electrical connection of the first conductor and the second conductor when the service module is in the first position and wherein the service wire connector is configured to connect the customer telecommunications conductor to the first conductor through the contact member when the service module is in the first position.

30. The terminal block of claim 29 wherein the contact member is configured to disconnect the electrical connection of the first conductor and the second conductor when the service module is in the first position.

31. The terminal block of claim 30 wherein the service wire connector comprises a first end of a longitudinally extending conductive member positioned to receive the customer telecommunications conductor and wherein the contact member comprises a second end of the longitudinally extending conductive member, the second end of the longitudinally extending conductive member contacting the first conductor when the service module is in the first position.

32. The terminal block of claim 31 wherein the service module further comprises a conductor chamber and the service wire connector is positioned in the conductor chamber.

33. The terminal block of claim 32 wherein the service module further comprises a passageway extending into the conductor chamber having an opening for receiving the customer telecommunications conductor and positioned to pass the customer telecommunications conductor to the service connector.

34. The terminal block of claim 31 wherein the first conductor is positioned adjacent to the second conductor so as to contact the second conductor when the service module is in the second position.

35. The terminal block of claim 34 wherein the service module further comprises a nonconductive member positioned to pass between the first conductor and the second conductor when the service module is in the first position and wherein the first conductor and the second conductor comprise a spring clip.

36. The terminal block of claim 35 wherein the nonconductive member extends from a bottom surface of the service module adjacent the base.

37. The terminal block of claim 35 wherein the contact member comprises:
   an electrically conductive layer on a surface of the nonconductive member adjacent the first conductor when the service module is in the first position; and
   a connector that electrically connects the electrically conductive layer to the service wire connector.

38. The terminal block of claim 35 wherein the nonconductive member includes a channel in a surface thereof adjacent the first conductor when the service module is in the first position and wherein the contact member is received in the channel of the nonconductive member.

39. The terminal block of claim 38 wherein the first connector comprises a first end of a second longitudinally extending conductive member and the first conductor comprises a second end of the second longitudinally extending conductive member and wherein the second connector comprises a first end of a third longitudinally extending conductive member and the second conductor comprises a second end of the third longitudinally extending conductive member.

40. The terminal block of claim 38 wherein the service wire connector is an insulation displacing connector.

41. The terminal block of claim 40 wherein the service module further comprises:
   a base portion defining a conductor chamber;
   a cover rotatably connected to a first end of the base portion on a top portion thereof displaced from the base of the terminal block; and
   a passageway in the cover extending into the conductor chamber, the passageway having an opening on a second end of the cover opposite the first end for receiving the customer telecommunications conductor, the passageway being positioned to pass the customer telecommunications conductor to the insulation displacing connector; and
   wherein rotation of the cover to a closed position connects the customer telecommunications conductor to the insulation displacing connector.

42. The terminal block of claim 38 wherein the terminal block further comprises:
   a third connector and a fourth connector mounted in the base;
   a third conductor extending from the base, the third conductor being electrically connected to the third connector;
   a fourth conductor extending from the base, the fourth conductor being electrically connected to the fourth connector, the fourth conductor and the third conductor comprising a second spring clip; and
   wherein the service module further comprises:
      a second service wire connector configured to receive a second customer telecommunications conductor; and
      a second contact member that electrically connects the second service wire connector to the third conductor when the service module is in the first position; and
   wherein the second spring clip electrically connects the third connector and the fourth connector when the service module is in the second position and wherein the service module is configured to electrically disconnect the first connector and the second connector when the service module is in the first position.

43. The terminal block of claim 42 wherein the nonconductive member includes a second channel in a surface thereof adjacent the third conductor when the service module is in the first position and wherein the second contact member is received in the second channel of the nonconductive member.

44. The terminal block of claim 43 wherein the second channel and the first channel are in opposite surfaces of the nonconductive member.

45. The terminal block of claim 43 wherein the first and second customer telecommunications conductors are tip and ring lines.

46. The terminal block of claim 45 wherein the service module further comprises a line protector electrically connected between the first conductor and the third conductor when the service module is in the first position.

47. The terminal block of claim 42 wherein the second service wire connector comprises a first end of a fourth longitudinally extending conductive member positioned to receive the second customer telecommunications conductor and wherein the second contact member comprises a second end of the fourth longitudinally extending conductive member, the second end of the fourth longitudinally extending conductive member contacting the third conductor when the service module is in the first position.

48. The terminal block of claim 47 wherein the first longitudinally extending conductive member further comprises a circuit connector and the fourth longitudinally extending conductive member further comprises a second circuit connector, the circuit connector and the second circuit connector being positioned to receive an electrical device therebetween.

49. The terminal block of claim 42 wherein the base is elongate and defines a first axis and wherein the first spring clip is positioned adjacent and laterally offset from the second spring clip with reference to the first axis and wherein a plurality of service modules are moveably mounted to the elongate base along the first axis.

50. The terminal block of claim 49 wherein the base includes an elongate chamber and wherein the first spring clip and the second spring clip are positioned in the elongate chamber.

51. The terminal block of claim 49 wherein the service module further comprises a circuit contact member that electrically connects to the second conductor when the service module is in the first position, the circuit contact member being configured to electrically connect an electrical device between the first connector and the second connector.

52. The terminal block of claim 29 wherein the terminal block further comprises a chamber including an environmental sealant that protects the electrical connection of the first conductor and the second conductor.

53. The terminal block of claim 52 wherein the environmental sealant is a gel.

54. A telecommunications terminal block for making and breaking connections between a first telecommunications conductor, a second telecommunications conductor and a service wire, said terminal block comprising:
   a housing having a first connector connected to the first telecommunications conductor and a second connector connected to the second telecommunications conductor mounted therein;

a first conductor in the housing, the first conductor being electrically connected to the first connector and having a service wire connector portion configured to receive the service wire;

a switch electrically connecting the first connector and the second connector, the switch having a first state wherein the first connector is electrically connected to the second connector and a second state wherein the first connector is electrically disconnected from the second connector, the switch comprising:

a third connector mounted adjacent the second connector in the housing, the first connector being electrically connected to the third connector; and a select module positioned over the second connector and the third connector, the select module having a first position in the housing electrically connecting the second connector and the third connector and a second position in the housing wherein the second connector and the third connector are not electrically connected.

55. The terminal block of claim 54 wherein the select module further comprises:

a housing; and a jumper conductor mounted in the housing of the select module, the jumper conductor having, when the select module is in the first position, a first end positioned to contact the second connector and a second end positioned to contact the third connector.

56. The terminal block of claim 55 wherein the first connector comprises a first end of a longitudinally extending member and the first conductor comprises an opposite end of the longitudinally extending member and wherein the housing of the terminal block comprises:

a base having a first portion and a second portion, the longitudinally extending member being mounted in the first portion with the first conductor extending from an upper surface of the base, the second connector and the third connector being mounted in the second portion of the base;

a movably mounted service wire connector member positioned adjacent the upper surface of the base in the first portion, the service wire connector member including a service wire receiving passageway that receives a service wire for connection to the first conductor, the service wire connector member having a first position that provides access to an opening to the service wire receiving passageway to receive a service wire and a second position wherein a portion of the service wire receiving passageway passes through an opening in the first conductor; and wherein the housing of the select module is mounted to the base adjacent the second portion.

57. The terminal block of claim 56 wherein the first conductor is an insulation displacing connector and wherein the service wire connector member is rotatably mounted to the base to insert a service wire in the passageway into the insulation displacing connector and wherein the housing of the select module is mounted to the base in a first orientation in the first position of the select module and in a second orientation in the second position of the select module.

58. The terminal block of claim 57 wherein the second orientation comprises substantially a 180° rotation from the first orientation.

59. The terminal block of claim 57 wherein the first telecommunications conductor is a tip conductor from a telephone company central office and wherein the second telecommunications conductor is a tip conductor extending from the terminal block downstream from the telephone company central office and wherein the service wire is a tip service wire from a user premise, the terminal block further comprising:

a ring input connector mounted in the first portion of the base of the housing of the terminal block connected to a corresponding ring conductor from the telephone company central office paired with the tip conductor;

a ring output connector mounted in the second portion of the base of the housing of the terminal block connected to a corresponding ring conductor extending from the terminal block downstream from the telephone company central office paired with the tip conductor extending from the terminal block downstream from the telephone company central office;

a ring conductor electrically connected to the ring input connector extending from the upper surface of the base of the housing of the terminal block in the first portion;

a ring jumper connector mounted in the second portion of the base of the housing of the terminal block adjacent the ring output connector, the ring jump connector being electrically connected to the ring input connector;

wherein the select module further comprises a second jumper conductor mounted in the housing of the select module, the second jumper conductor having, when the select module is in the first position, a first end positioned to contact the ring output connector and a second end positioned to contact the ring jumper connector; and wherein the service wire connector member further comprises a second service wire receiving passageway that receives a ring service wire for connection to the ring conductor, the service wire connector member having a first position that provides access to an opening to the second service wire receiving passageway to receive the ring service wire and a second position wherein a portion of the second service wire receiving passageway passes through an opening in the ring conductor.

60. The terminal block of claim 59 further comprising a ground connector mounted in the second portion of the base of the housing of the terminal block and further comprising an electrical protection device positioned in the housing of the select module so as to be electrically connected between the jumper conductor and the ground connector and between the second jumper conductor and the ground connector.

61. The terminal block of claim 59 wherein the base of the housing of the terminal block is elongate and includes a plurality of termination stations, the termination stations having respective first portions and second portions, tip and ring input connectors, tip and ring output connectors, tip and ring service wire conductors, select modules and service wire connector members to provide a multi-station terminal block.

62. The terminal block of claim 54 wherein the switch further comprises a chamber including an environmental sealant that protects the electrical connection of the first connector and the second connector.

63. The terminal block of claim 62 wherein the environmental sealant is a gel.

64. A telecommunications terminal block for making and breaking connections between a first telecommunications conductor, a second telecommunications conductor and a service wire, said terminal block comprising:

a housing having a first connector connected to the first telecommunications conductor and a second connector connected to the second telecommunications conductor mounted therein;

a first conductor in the housing, the first conductor being electrically connected to the first connector and having a service wire connector portion configured to receive the service wire;

a switch electrically connecting the first connector and the second connector, the switch having a first state wherein the first connector is electrically connected to the second connector and a second state wherein the first connector is electrically disconnected from the second connector; and wherein the housing of the terminal block further comprises:

a base having a first portion and a second portion, the first connector and the first conductor being mounted in the first portion with the service wire connector portion extending from an upper surface of the base, the second connector being mounted in the second portion of the base;

a movably mounted service wire connector member positioned adjacent the upper surface of the base in the first portion, the service wire connector member including a service wire receiving passageway that receives a service wire for connection to the first conductor, the service wire connector member having a first position that provides access to an opening to the service wire receiving passageway to receive a service wire and a second position wherein a portion of the service wire receiving passageway passes through an opening in the service wire connector portion of the first conductor;

a contact member electrically connected to the second connector and extending from the base of the housing of the terminal block and contacting the first conductor; and an actuator positioned in the service wire connector member so as to allow the contact member to contact the first conductor in the first position of the service wire connector member and to break the contact between the contact member and the first conductor in the second position of the service wire connector member.

65. The terminal block of claim 64 wherein the contact member comprises a first end of an elongate conductive member and wherein the second connector comprises a second end of the elongate conductive member and wherein the actuator comprises a cam.

66. The terminal block of claim 64 wherein the switch further comprises a chamber including an environmental sealant that protects the electrical connection of the first connector and the second connector.

67. The terminal block of claim 66 wherein the environmental sealant is a gel.

68. A telecommunications terminal block for making and breaking connections between a telecommunication conductor and a service wire, said terminal block comprising:

a housing having a first connector and a second connector mounted therein, the first connector being electrically connected to the telecommunication conductor;

a first conductor in the housing, the first conductor having a first end electrically connected to the second connector and having an insulation displacing service wire connector portion configured to receive the service wire on a second end thereof displaced from the first end of the first conductor;

an electrical protection device positioned in series between and electrically connecting the first connector and the second connector, wherein the electrical protection device is configured to break the electrical connection between the first connector and the second connector.

69. The terminal block of claim 68 wherein the electrical protection device is a fuse circuit.

70. The terminal block of claim 69 wherein the housing further comprises:

a base having a first portion and a second portion, the first conductor being mounted in the first portion with the service wire connector portion extending from an upper surface of the base, the first connector and the second connector being mounted in the second portion of the base, the second connector being mounted adjacent the first connector;

a movably mounted service wire connector member positioned adjacent the upper surface of the base in the first portion, the service wire connector member including a service wire receiving passageway that receives a service wire for connection to the service wire connector portion, the service wire connector member having a first position that provides access to an opening to the service wire receiving passageway to receive a service wire and a second position wherein a portion of the service wire receiving passageway passes through an opening in the service wire connector portion; and a protection module mounted to the base adjacent the second portion, the electrical protection device being positioned in the protection module.

71. The terminal block of claim 68 wherein the housing further comprises a chamber including an environmental sealant, the electrical protection device being positioned in the chamber.

72. The terminal block of claim 71 wherein the environmental sealant is a gel.

* * * * *